(12) United States Patent
Tsuchiya

(10) Patent No.: US 12,117,794 B2
(45) Date of Patent: Oct. 15, 2024

(54) METHOD FOR PROCESSING WORKPIECE AND MACHINE FOR PROCESSING WORKPIECE

(71) Applicant: Shibaura Machine Co., Ltd., Tokyo (JP)

(72) Inventor: Koji Tsuchiya, Numazu (JP)

(73) Assignee: Shibaura Machine Co., Ltd., Tokyo (JP)

( * ) Notice: Subject to any disclaimer, the term of this patent is extended or adjusted under 35 U.S.C. 154(b) by 894 days.

(21) Appl. No.: 17/054,716

(22) PCT Filed: May 9, 2019

(86) PCT No.: PCT/JP2019/018579
§ 371 (c)(1),
(2) Date: Nov. 11, 2020

(87) PCT Pub. No.: WO2019/221005
PCT Pub. Date: Nov. 21, 2019

(65) Prior Publication Data
US 2021/0063995 A1    Mar. 4, 2021

(30) Foreign Application Priority Data

May 15, 2018  (JP) .................................. 2018-093583
Oct. 17, 2018  (JP) .................................. 2018-195548
Apr. 2, 2019   (JP) .................................. 2019-070632

(51) Int. Cl.
G05B 19/404        (2006.01)
B23C 5/10          (2006.01)

(52) U.S. Cl.
CPC .......... G05B 19/404 (2013.01); B23C 5/1009 (2013.01); *G05B 2219/45145* (2013.01)

(58) Field of Classification Search
CPC ........ G05B 19/404; G05B 2219/45145; G05B 2219/50313; G05B 2219/50315;
(Continued)

(56) References Cited

U.S. PATENT DOCUMENTS 5,255,199 A   10/1993  Barkamn et al.
5,825,017 A * 10/1998  Pryor ........................ F02F 1/24
                                                 250/559.08

(Continued)

FOREIGN PATENT DOCUMENTS

CN   102581705 A    7/2012
DE   102015221000 A1  4/2016
(Continued)

OTHER PUBLICATIONS

International Search Report of PCT/JP2019/018579 dated Jun. 11, 2019.
(Continued)

*Primary Examiner* — Thomas C Lee
*Assistant Examiner* — Tyler Dean Hedrick
(74) *Attorney, Agent, or Firm* — DLA Piper LLP (US)

(57) ABSTRACT

A method for processing a workpiece with a tool is provided with holding the workpiece, holding the tool, and moving the held tool relative to the held workpiece in accordance with an NC program including an arithmetic expression to calculate a position of the held tool.

6 Claims, 38 Drawing Sheets

(58) Field of Classification Search
CPC ...... G05B 2219/50319; G05B 19/4093; B23C 5/1009; Y02P 90/02; B23Q 15/00
See application file for complete search history.

(56) References Cited

U.S. PATENT DOCUMENTS

| | | | |
|---|---|---|---|
| 2005/0222705 A1* | 10/2005 | Budd | G01B 11/2433 700/175 |
| 2006/0251484 A1* | 11/2006 | Yoshida | B23Q 17/2233 409/80 |
| 2016/0114449 A1 | 4/2016 | Inagaki | |
| 2018/0246492 A1 | 8/2018 | Ido et al. | |
| 2019/0143467 A1* | 5/2019 | Wang | G05B 19/4065 700/175 |
| 2020/0004221 A1* | 1/2020 | Sarup | G05B 19/4065 |

FOREIGN PATENT DOCUMENTS

| | | |
|---|---|---|
| JP | 63-233403 A | 9/1988 |
| JP | 4-52803 A | 2/1992 |
| JP | 4-75106 A | 3/1992 |
| JP | 2004-227327 A | 8/2004 |
| JP | 2005-088148 | 4/2005 |
| JP | 2014-531332 A | 11/2014 |
| JP | 2017-54403 A | 3/2017 |

OTHER PUBLICATIONS

Written Opinion of PCT/JP2019/018579 dated Jun. 11, 2019.
Office Action for German Patent Application No. 112019002459.0, dated Aug. 6, 2024, 11 pages.

* cited by examiner

FIG. 11A (1) NORMAL VECTOR AT PROCESSING POINT 1 x CORRECTION VALUE AT PROCESSING POINT 1

(2) NORMAL VECTOR AT PROCESSING POINT 2 x CORRECTION VALUE AT PROCESSING POINT 2

(3) EVASIVE VECTOR AT PROCESSING POINT 1 x CORRECTION VALUE AT PROCESSING POINT 1 x TAN $\theta$ (4) EVASIVE VECTOR AT PROCESSING POINT 21 x CORRECTION VALUE AT PROCESSING POINT 2 x TAN $\theta$

Where the bracketed groups correspond to: CORRECTION VALUE AT PROCESSING POINT 1, CORRECTION VALUE AT PROCESSING POINT 2, EVASION VALUE AT PROCESSING POINT 1, EVASION VALUE AT PROCESSING POINT 2.

FIG. 14A (1) NORMAL VECTOR (i1,j1,k1) AT PROCESSING POINT 1 x
   CORRECTION VALUE #50A AT PROCESSING POINT 1
(2) NORMAL VECTOR (i2,j2,k2) AT PROCESSING POINT 2 x
   CORRECTION VALUE #50C AT PROCESSING POINT 2
(3) EVASIVE VECTOR (i11,j11,k11) AT PROCESSING POINT 1 x
   CORRECTION VALUE #50A AT PROCESSING POINT 1 x TAN $\theta$
(4) EVASIVE VECTOR (i22,j22,k22) AT PROCESSING POINT 21 x
   CORRECTION VALUE #50C AT PROCESSING POINT 2

FIG. 14B

| CORRECTION VALUE AT PROCESSING POINT 1 | CORRECTION VALUE AT PROCESSING POINT 2 | EVASION VALUE AT PROCESSING POINT 1 | EVASION VALUE AT PROCESSING POINT 2 |

$X[Px+[i1*\#50A+i2*\#50C+i11*\#50A*\tan\theta+i22*\#50C*\tan\theta]]$
$Y[Py+[j1*\#50A+j2*\#50C+j11*\#50A*\tan\theta+j22*\#50C*\tan\theta]]$
$Z[Pz+[k1*\#50A+k2*\#50C+k11*\#50A*\tan\theta+k22*\#50C*\tan\theta]]$

FIG. 15

$X[Px+[i1+i11*\tan\theta]*\#50A+[i2*+i22*\tan\theta]*\#50C]$
$Y[Py+[j1+j11*\tan\theta]*\#50A+[j2*+j22*\tan\theta]*\#50C]$
$Z[Pz+[k1+k11*\tan\theta]*\#50A+[k2*+k22*\tan\theta]*\#50C]$

FIG. 16

$X[Px+[i1+i11*\tan\theta]*[\#50A*[1-\alpha]+\#50B*\alpha]+[i2*+i22*\tan\theta]*[\#50C*[1-\beta]+\#50D*\beta]]$
$Y[Py+[j1+j11*\tan\theta]*[\#50A*[1-\alpha]+\#50B*\alpha]+[j2*+j22*\tan\theta]*[\#50C*[1-\beta]+\#50D*\beta]]$
$Z[Pz+[k1+k11*\tan\theta]*[\#50A*[1-\alpha]+\#50B*\alpha]+[k2*+k22*\tan\theta]*[\#50C*[1-\beta]+\#50D*\beta]]$

METHOD FOR PROCESSING WORKPIECE AND MACHINE FOR PROCESSING WORKPIECE

CROSS REFERENCE TO RELATED APPLICATIONS

This application is a U.S. National Stage Application of International Application No. PCT/JP2019/018579 filed May 9, 2019, which claims priority from Japanese Patent Application No. 2018-093583 filed May 15, 2018, Japanese Patent Application No. 2018-195548 filed Oct. 17, 2018, and Japanese Patent Application No. 2019-070632 filed Apr. 2, 2019. The entirety of all the above-listed applications are incorporated herein by reference.

TECHNICAL FIELD

The disclosure herein relates to a method for processing a workpiece and a machine for processing a workpiece, and in particular to those correcting a contour of a tool to process a workpiece.

BACKGROUND ART

Machines (NC processing machines) for workpieces, in which NC programs (programs) are used to move tools relative to the workpieces and as well carry out machining of the workpieces, have been thus far known.

In the prior NC processing machines, for example, tools such as an end mill are made to rotate and are relatively moved in accordance with concrete numerals (values such as decimal fractions) contained in the NC programs to carry out machining of the workpieces. The patent literature 1 is herein exemplified to show the prior art.

CITATION LIST

Patent Literature

PTL 1: Japanese Patent Application Laid-open No. S63-233404

SUMMARY OF THE INVENTION

By the way, on the tool exists errors in the contour thereof (difference between a contour of an ideal tool and the contour of the real tool). In a processing machine for ultraprecision machining, most of causes for creating errors in shape of the workpiece are originated from errors in a contour of a tool such as an end mill.

Thus it could be considered that errors in shape of the workpiece could be minimized as small as possible by processing a workpiece with correcting the position of the tool in accordance with the errors in the contour of the tool. Then a program could be simplified if the tool is relatively moved on the basis of concrete numerals contained in the program.

Use of the concrete numerals, however, may cause a program that the NC program should be rewritten in each case when the tool is replaced or the tool is worn out.

The present invention has been created in light of the aforementioned problems and is intended to provide a method for processing a workpiece and a machine for processing the workpiece that eliminates the need for rewriting the NC program in each case when the tool is replaced or the tool is worn out in the machine for processing the workpiece, the method for processing the workpiece and the program therefor to process the workpiece with correcting the position of the tool in accordance with the errors in the contour of the tool.

According to an aspect, a method for processing a workpiece with a tool is provided with holding the workpiece, holding the tool, and moving the held tool relative to the held workpiece in accordance with an NC program including an arithmetic expression to calculate a position of the held tool.

According to another aspect, a machine for processing a workpiece with a tool is provided with a holding section for holding the workpiece, a tool holding section for holding the tool, and a moving section for moving the held tool relative to the held workpiece, the moving section being controlled by an NC program including an arithmetic expression to calculate a position of the held tool.

BRIEF DESCRIPTION OF THE DRAWINGS

FIG. 6 is an example of positional coordinates of the tool where the position is corrected in accordance with the present embodiment.

FIG. 8 is an example of positional coordinates corrected in light of the processing point shown in FIG. 7.

FIG. 11A is an example of correction values for positional coordinates.

FIG. 11B is an example of corrected positional coordinates.

FIG. 12 is an example where the example of FIG. 11B is modified.

FIG. 13 is an example of positional coordinates corrected in light of the two processing points in the example shown in FIG. 7.

FIG. 14A is an example of generalized correction values about the example of FIG. 11A.

FIG. 14B is an example of generalized corrected positional coordinates about the example of FIG. 11B.

FIG. 15 is an example where the example of FIG. 14B is modified.

FIG. 16 is an example where the example of FIG. 13 is generalized in light of two processing points.

FIG. 30 is an example of positional coordinates corrected in light of depths of wear.

DESCRIPTION OF EMBODIMENTS

Exemplary embodiments will be described hereinafter with reference to the appended drawings.

Figure 1:
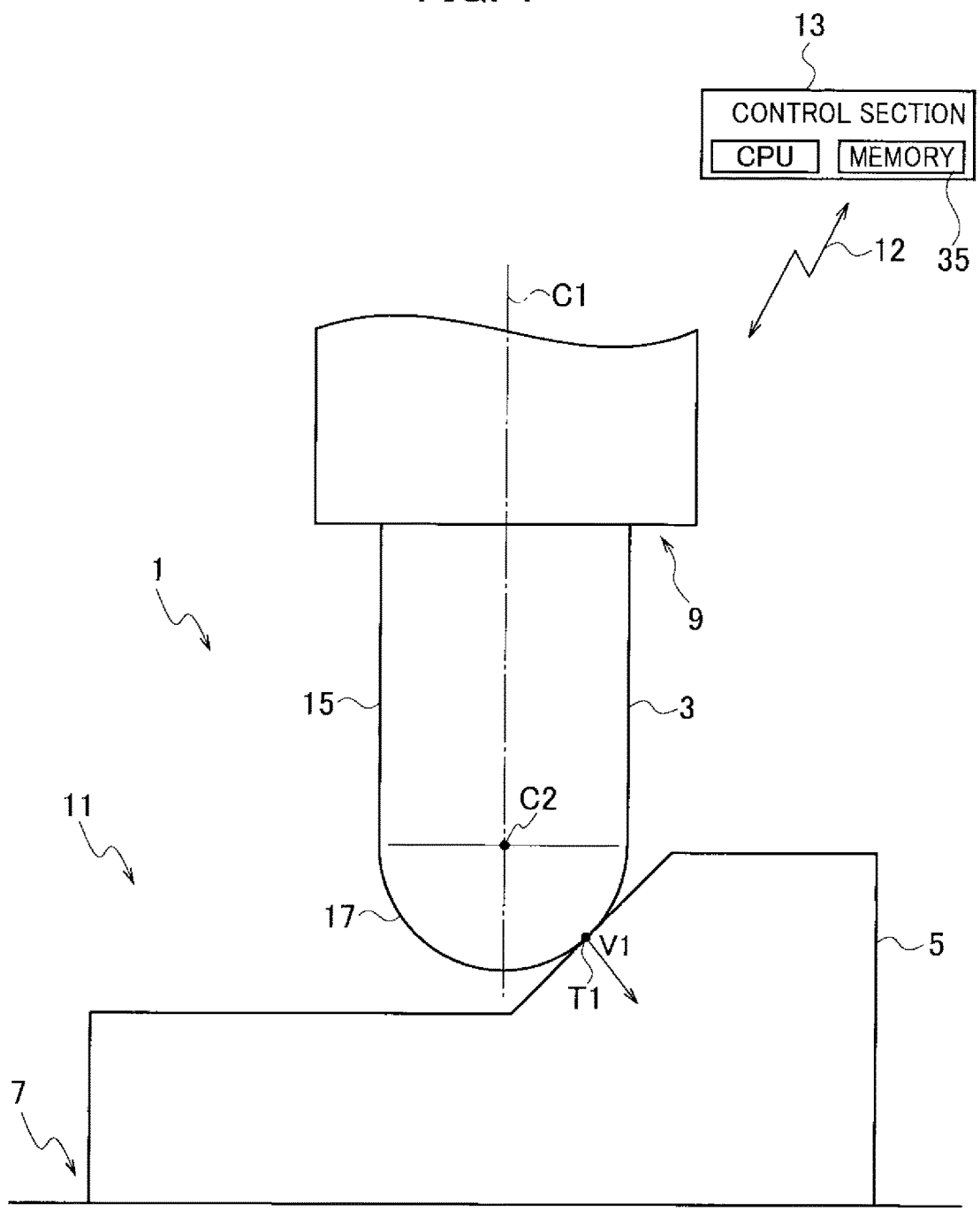
FIG. 1 is a schematic elevational view of a held workpiece and a tool in contact therewith in a processing machine according to an embodiment.
Figure 17:
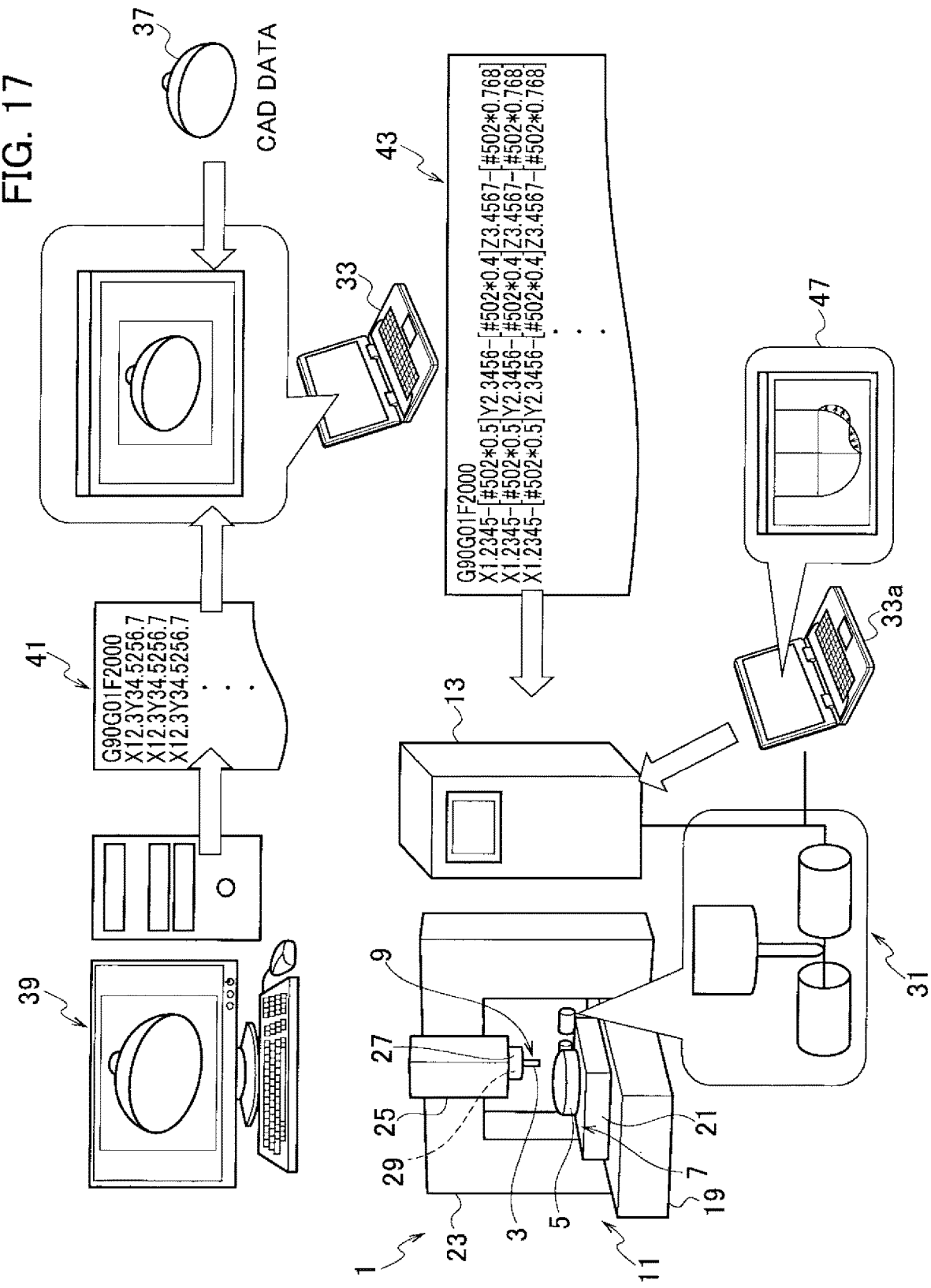
FIG. 17 is a drawing schematically depicting a system including a processing machine in accordance with the present embodiment and a general-purpose computer for controlling the processing machine.

A machine (processing machine) 1 for processing a workpiece according to an embodiment of the present invention is what uses a tool (machining tool such as a ball-end mill) 3 to process a workpiece 5, and is as shown in such as FIGS. 1 and 17 provided with a workpiece holding section 7, a tool holding section 9, a moving section 11 and a control section 13 (controller).

A predetermined one direction in the space is herein defined to be an X-direction (X-axis direction; lateral direction), another direction a Y-direction (Y-axis direction; lengthwise direction), and a direction perpendicular to both the X-direction and the Y-direction a Z-direction (Z-axis direction; vertical direction). Meanwhile, while in this definition the X-direction and the Y-direction are horizontal and Z-direction are vertical, this is not limiting. Specifically, the X-direction or the Y-direction may be vertical and the X-, Y-, and Z-directions may be oblique to the horizontal or vertical direction.

The workpiece holding section 7 is so configured as to hold the workpiece 5 and the tool holding section 9 is so configured as to hold the tool 3. The already held tool 3 (simply referred to as "tool 3" hereinafter) held by the tool holding section 9 is to process (machine) the already held workpiece 5 (simply referred to as "workpiece 5" hereinafter) held by the workpiece holding section 7.

The (ball-end mill) as the tool 3 is provided with a cutting-teeth section around its periphery. Describing in more detail, the ball-end mill 3 is provided with a columnar proximal section 15 (see FIG. 1) and a semi-spherical tip section 17. The diameter of the proximal section 15 and the diameter of the tip section 17 are identical to each other and it is so structured that one end in the elongated direction along the central axis C1 of the proximal section 15 sticks to the tip section 17. Meanwhile the central axis of the tip section 17 and the central axis C1 of the proximal section 15 are identical to each other.

A center of a round end face of the tip section 17 (the end face sticking to the round end face of the proximal section 15) is herein defined to be a center C2 of the tip section 17. This center C2 exists on the central axis C1 of the tool 3.

The cutting teeth of the ball-end mill 3 is formed on the periphery of the tip section 17 and the end section of the proximal section 15 (the end section at the side of the tip section 17). The ball-end mill 3 is to held by the tool holding section as another end section of the proximal section 15 engages with the tool holding section 9.

And, as the tool 3 held by the tool holding section 9 rotates (makes rotation about the central axis C1), the cutting teeth cut the workpiece 5.

The moving section 11 is so configured as to move the tool 3 relative to the workepiece 5 in order to process the workpiece 5 with the already held tool 3. More specifically, it may be configured either to move the tool 3 relative to the workpiece 5 or to move the workpiece 5 relative to the tool 3.

The control section 13 is for example a general-purpose computer at least provided with a processor such as a central processing unit (CPU) and a memory device such as a semiconductor memory 35. The control section 13 is connected via a wireless or wired communication path 13 with a moving section 11 and as well has a built-in pre-installed or post-installed NC program that will be later described. The control section 13 controls the moving section 11 via the communication path 12 according to control by the NC program, thereby moving the tool 3 relative to the workpiece 5.

Describing in more detail, as shown in FIG. 17, the processing machine 1 for the workpiece 5 is provided with a bed 19, a table 21, a column 23, a main shaft support 25, a main shaft chassis 27 and a spindle 29.

The table 21 is supported via a not-shown linear-guide bearing by a bed 19, and is to be moved (moved and set in place) relative to the bed 19 in the X-direction by means of a no-shown actuator such as a linear motor.

The column 23 is unitarily provided on the bed 19. The main shaft support 25 is supported via a not-shown linear guide bearing by the column 23 and is to move relative to the column 23 in the Y-direction by means of a not-shown actuator such as a linear motor.

The main shaft chassis 27 is supported via a not-shown linear guide bearing by the main shaft support 25 and is to move relative to the main shaft support 25 in the Z-direction by means of a not-shown actuator such as a linear motor.

The spindle 29 is supported via a bearing by the main shaft chassis 27 and is made rotatable about the central axis (the central axis in common with the tool 3 elongated in the Z-direction) C1 relative to the main chassis 27.

The spindle 29 is provided with the tool holding section 9 and on the table 21 provided with the workpiece holding section 7. The already held tool 3 is thereby to relatively move relative to the workpiece 5 in the X-direction, the Y-direction and the Z-direction.

In the NC program embedded is an arithmetic expression (an arithmetic expression using four arithmetic operations for example) for calculating a position of the tool 3 (positional coordinates relative to the workpiece 5). More specifically, the positional coordinates when moving the already held tool 3 are to be determined by a solution of the arithmetic expression.

Further, the NC program is so configured as to use the arithmetic expression to correct the position of the tool 3 in order to suppress creation of processing errors of the workpiece 5 caused by errors in the contour of the tool 3.

Correction of the position of the tool 3 is made by using a normal vector V1 at a processing point T1 (details will be described later) of the tool 3 relative to the processing surface and the errors in the contour of the tool 3. The three-dimensional position of the tool 3 is thereby corrected in any direction (determined by the form of the normal vector V1) of the X-direction, the Y-direction and the Z-direction.

Describing in more detail, the errors in the contour of the tool 3 are in advance determined by a tool shape measuring device 31 shown in FIG. 17 before practically processing the workpiece 5.

The tool shape measuring device 31 is installed on a predetermined location in the processing machine 1 for the workpiece. And, the outline of the already held tool 3 is to be measured online (online on the processing machine 1 for the workpiece) by positioning the already held tool 3 at a position where the shape of the already held tool 3 can be measured by the tool shape measuring device 31 (such as a laser and a camera) and rotating the already held tool 3 (rotation about the central axis C1).

Differences (differences in respective spots of the tool 3) between the outline of the already held tool 3 and the outline of the already held tool 3 in its ideal shape (without any errors in shape) are defined as "errors in the contour" of the tool 3. Meanwhile, a process for using the "tool shape measuring device 31" to initially calculate errors in a contour of the tool 3 will be referred to as a "initial calibration process" hereafter.

Figure 2A:
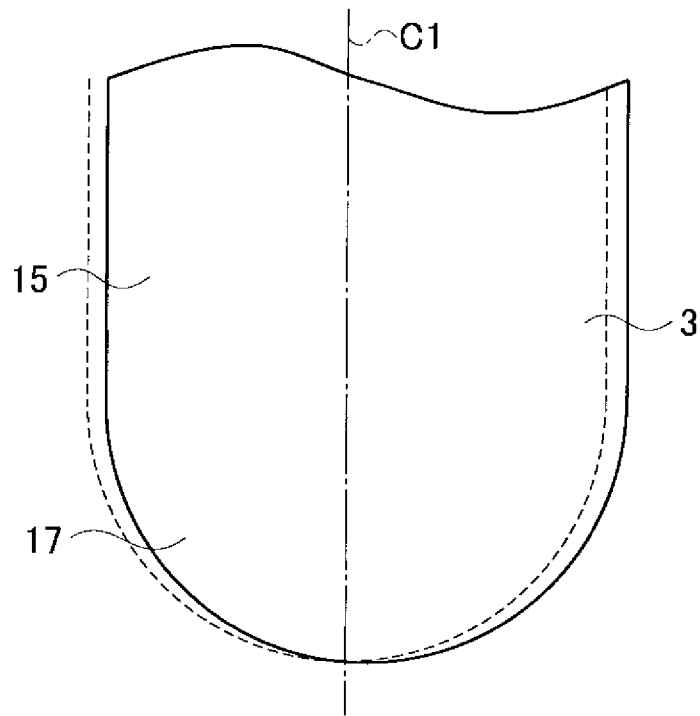
FIG. 2A is a schematic elevational view describing errors in a contour of the tool in a condition where the tool is stationary.

What is depicted by the broken line in FIG. 2A is an outline of the tool in its ideal shape and what is depicted by the solid line therein is an outline of the tool 3 in its real shape with errors in shape. In FIG. 2A, the tool does not rotate about the central axis C1. Further, the already held tool 3 shown by the solid line in FIG. 2A is deviated very slightly rightward relative to the central axis C1.

Figure 2B:
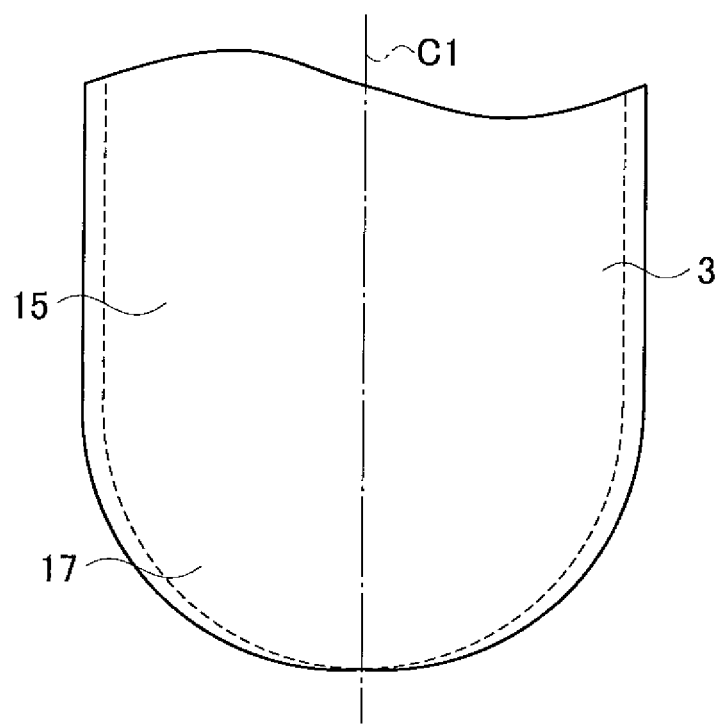
FIG. 2B is a schematic elevational view describing errors in a contour of the tool in a condition where the tool rotates.

What is depicted by the broken line in FIG. 2B is an outline of the tool in its ideal shape and what is depicted by the solid line therein is an outline of the real tool 3 with errors (the tool 3 shown by the solid line in FIG. 2A) rotated about the central axis C1.

The shape of the tool 3 shown by the solid line in FIG. 2B, as a matter of course, has line symmetry about the central axis C1. If the workpiece 5 is processed by the tip section 17 of the ball-end mill 3, the errors in the contour of the ball-end mil 3 could be determined only about the quarter of the circle of the tip section 17 (more specifically, in the range of 90 degrees) as shown in FIG. 3.

In the meantime, an example of the tool shape measuring device is what Japanese Patent Application Laid-open S63-233403 discloses.

Here, the errors in the contour of the tool (ball-end mill) 3 will be further described with reference to FIG. 3.

Figure 3:
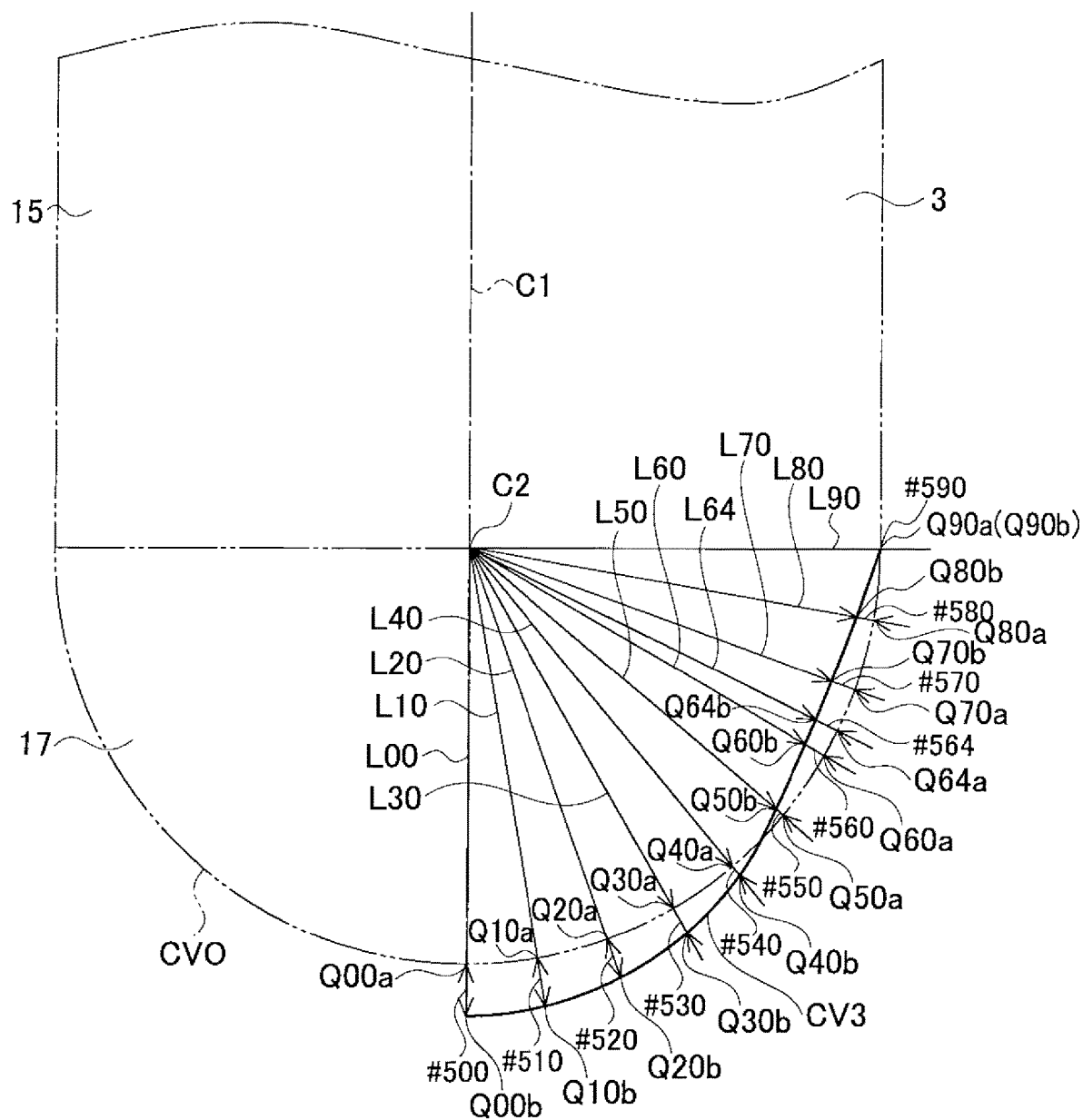
FIG. 3 is a schematic elevational view describing errors in a contour of the tool and describing an aspect in which errors at respective points are calculated.

What is shown as a semicircle by the double-dot chain line in FIG. 3 is an outline shape of the tool without any errors in shape. What is shown by the solid line in FIG. 3 is an outline shape of the tip section 17 of the tool 3 measured by the tool shape measuring device 31. In the drawing, to facilitate understanding thereof, the errors in the contour are exaggerated.

A plurality of half lines L00-L90 extending from the center C2 of the semispherical tip section 17 of the tool 3 toward the outline of the quarter circle is drawn at even intervals of 10 degrees. The angle of intersection between the central axis C1 of the tool and the half line L00 is 0 degrees. The angle of intersection between the central axis C1 of the already held tool 3 and the half line L10 is 10 degrees. Similarly, the angles of intersection between the central axis C1 of the already held tool 3 and the half lines L20-L90 are 20 degrees through 90 degrees.

Here, the intersection point between the half line L00 and the outline of the tool in ideal shape is defined to be intersection point Q00a. Similarly the intersection points between the half lines L10, L20, ... L90 and the outline of the tool in ideal shape are defined to be intersection points Q10a, Q20a, ... Q90a. On the other hand, the intersection points between the half lines L00, L10, L20, ... L90 and the outline of the tool 3 actually measured by the tool shape measuring device 31 are defined to be intersection points Q00b, Q10b, Q20b, ... Q90b.

And, respective differences are, with reference signs #500-#590, stored in the memory or such. Concretely, it is defined that #500=Q00b-Q00a, #510=Q10b-Q10a, similarly in the rest, and #590=Q90b-Q90a.

The values of the dimensions referred by the reference signs (used as program variable numerals) #500-#590 are, on the half lines L00-L90, distances between the intersection points Q00a-Q90a on the outline of the tool in ideal shape and the intersection points Q00b-Q90b on the outline of the real tool 3, and indicate errors in the contour of the tool 3 on the respective half lines.

Meanwhile in FIG. 3, as the angles of intersection of the half lines L00-L90 about the central axis C1 of the tool 3 are cut into 10 degrees, the errors in the contour of the tool 3 are determined and then exist in 10 spots, whereas angles of intersections could be further finely cut (for example, every 1 degree).

More specifically, the errors in the contour of the tool 3 may be determined and exist at 91 spots thereon in a way of, for example, the error in the contour of the tool 3 (the distance between the intersection point Q64a and the intersection point Q64b; #564) on the half line L64, the angle of intersection of which is 64 degrees relative to the central axis C1 of the tool 3.

These values of the errors in the contour are in advance, as the data indicating the errors in the contour of the tool 3, stored in the memory of the PC 33a (or of the PC33 or the memory 35 of the control section 13) shown in FIG. 17 by executing the "initial calibration process" described already using the tool shape measuring device 31, before carrying out processing on the workpiece 5 by the tool 3. Meanwhile, what are shown by the reference sign 47 in FIG. 17 are data showing the errors in the contour of the tool 3.

Here, the NC program for preventing degeneration of processing precision of the workpiece 5 caused by the errors in the contour of the tool 3 (NC-with-correction program) will be described.

As shown in FIG. 17, a normal vector (unit normal vector) V1 at a processing point T1 (see FIG. 4) of the tool 3 is calculated by the PC 33 (or the PC 33a) for example from the CAD data (data showing the shape of the workpiece as a final product) 37 and a processing path (the NC program based on the CAD data provided that the errors in the contour of the tool are 0) generated by a CAM 39.

A contact point between the tool 3 and the workpiece 5 is to be the processing point T1 when the cutting-teeth section of the semispherical tip section 17 of the tool 3 cuts the workpiece 5.

Describing further, while the tool 3 moves in the X-direction, the Y-direction and the Z-direction relative to the workpiece 5 when the tool 3 is used to cut the workpiece 5 in a predetermined cut-in depth, a point where the tool 3 is in contact with the workpiece 5 in the rearmost end in the moving direction (a spot where the outline shape of the workpiece is determined after processing) in the course of this processing is to be the processing point T1.

While a surface centered on the processing point T1 and around the processing point T1 is a curved surface, it could be acknowledged that a minute flat plane exists. The normal vector V1 is a vector perpendicular to the aforementioned minute curved surface and is composed of a component in the X-direction, a component in the Y-direction and a component in the Z-direction. Further, the normal vector V1 has a scalar of "1". More specifically, the normal vector V1 is a unit vector. And, in the present embodiment, by the initial calibration process, a deviation value (scalar value) of the tool 3 is calculated. Further, the normal vector V1 is calculated. And, as will be described later, the normal vector V1 will be resolved into respective components in the X-direction, the Y-direction and the Z-direction, and further multiplied by the deviation value to get respective deviation values in the X-direction, the Y-direction and the Z-direction.

Correction of the position of the already held tool 3 at a time of cutting the workpiece 5 will be described more.

Figures 4, 5:
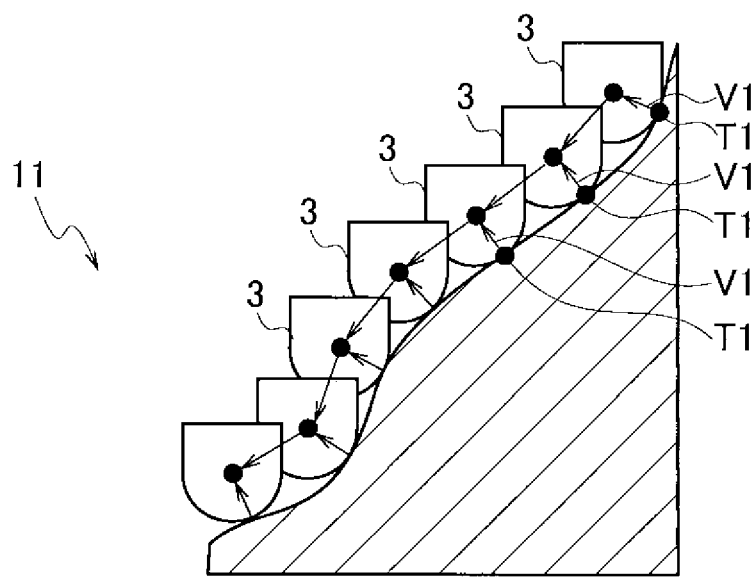
FIG. 4 is a schematic elevational partial sectional view showing a travel path of the tool relative to the held workpiece.
FIG. 5 is an example of positional coordinates of the tool where the position is not corrected.

As shown in FIG. 4, when the workpiece 5 is to be cut, the tool 3 moves in any one direction of the X-direction, the Y-direction and the Z-direction relative to the already held workpiece 5. The coordinate values of the tool 3 then are, as shown in FIG. 5 for example, slightly changes from coordinate values f51 (X-1.60657 Y-0.42583 Z-1.09809) into coordinate values f52 (X-1.62951 Y-0.6141 Z-1.09809) at a fraction of the time, as the tool 3 moves linearly for example. Similarly, it moves from the coordinate values f52 to coordinate values f53, from the coordinate values f53 to coordinate values f54, from the coordinate values f54 to coordinate values f55, and .... The processing point T1 also inherently moves.

Meanwhile, what is shown in FIG. 5 shows the coordinate values (a part of the NC program) of the tool 3 without any correction about the errors in the contour of the tool 3 (namely, cutting by an ideal tool).

Figure 6:
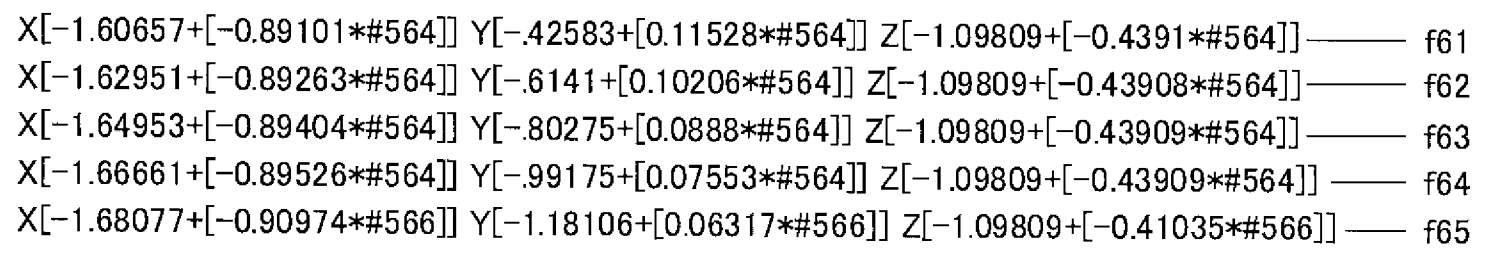

FIG. 6 shows coordinate values f61-f65 in which correction values are added to the coordinate values f51-f55 shown in FIG. 5. As the errors in the contour of the tool 3 are corrected, the tool 3 passes through ... the coordinate values f61, the coordinate values f62, the coordinate values f63, the coordinate values f64, the coordinate values f65 ..., as shown in FIG. 6, in this order and thereby machining the workpiece 5. Meanwhile the coordinate values f61, the coordinate values f62 . . . comprise arithmetic expressions and these values are prepared and sent by the PC 33 to the control section 13 of the processing machine 1 for the workpiece. And, calculation of the arithmetic expressions is to be executed by the control section 13. Meanwhile, it could be configured so that the control section 13, without using the PC 33, prepares the coordinate values f61, the coordinate values f62 comprising the arithmetic expressions.

Coordinate values of the already held tool 3 when correcting the errors in the contour of the tool 3 will be described with the example of the coordinate values f61.

The X-coordinate of "−1.60657" in the coordinate values f61 is an X-coordinate value of the already held tool 3 before being corrected (without any correction of the errors in the contour). "−0.89101" in the coordinate values f61 is a component in the X-direction of the normal vector V1 at the processing point T1. "*" in the coordinate values f61 is a symbol of multiplication (×). A reference sign "#564" in the coordinate values f61 is an error in the contour (scalar value) of the tool 3 at the processing point T1 as described with reference to FIG. 3.

A Y-coordinate "−0.42583" in the coordinate values f61 is a coordinate value in the Y-direction of the tool 3 before being corrected (without any correction of the errors in the contour). "0.11528" in the coordinate values f61 is a component in the Y-direction of the normal vector V1 at the processing point T1. A reference sign "#564" in the coordinate values f61 is an error in the contour (scalar value) of the tool 3 at the processing point T1 as described with reference to FIG. 3.

A Z-coordinate "−1.09809" in the coordinate values f61 is a coordinate value in the Z-direction of the tool 3 before being corrected (without any correction of the errors in the contour). "−0.4391" in the coordinate values f61 is a component in the Z-direction of the normal vector V1 at the processing point T1. A reference sign "#564" in the coordinate values f61 is an error in the contour (scalar value) of the tool 3 at the processing point T1 as described with reference to FIG. 3.

Meanwhile, the magnitude of the vector V1 having the X-direction component, the Y-direction component and the Z-direction component at the coordinate values f61 is to be "1". More specifically, "((−0.89101 . . . )2+(0.11528 . . . )2+(−0.4391 . . . )2)½=1"

Here, action of a processing system for the workpiece comprising the processing machine 1 for the workpiece 5, the PC 33, and the CAM 39 as shown in FIG. 17 will be described.

At an initial state, the tool 3 is held by the tool holding section 9, the workpiece 5 is held by the tool holding section 7, and the errors in the contour of the already held tool 3 are measured.

At the aforementioned initial state, executed are: creating a processing path 41 by the CAM 39, creating a processing path (corrected processing path) 43 corrected on the basis of the errors in the contour of the tool 3 by the PC 33 with the CAD data 37 and the processing path 41, and sending the corrected processing path 43 to the control device (control section 13) of the processing machine 1 for the workpiece.

The processing machine 1 for the workpiece, under control by the control section 13, controls the moving section 11 on the basis of the corrected processing path 43, and properly moves the already held tool 3 with rotating it relative to the already held workpiece 5 to execute machining the already held workpiece 5.

Figure 29:
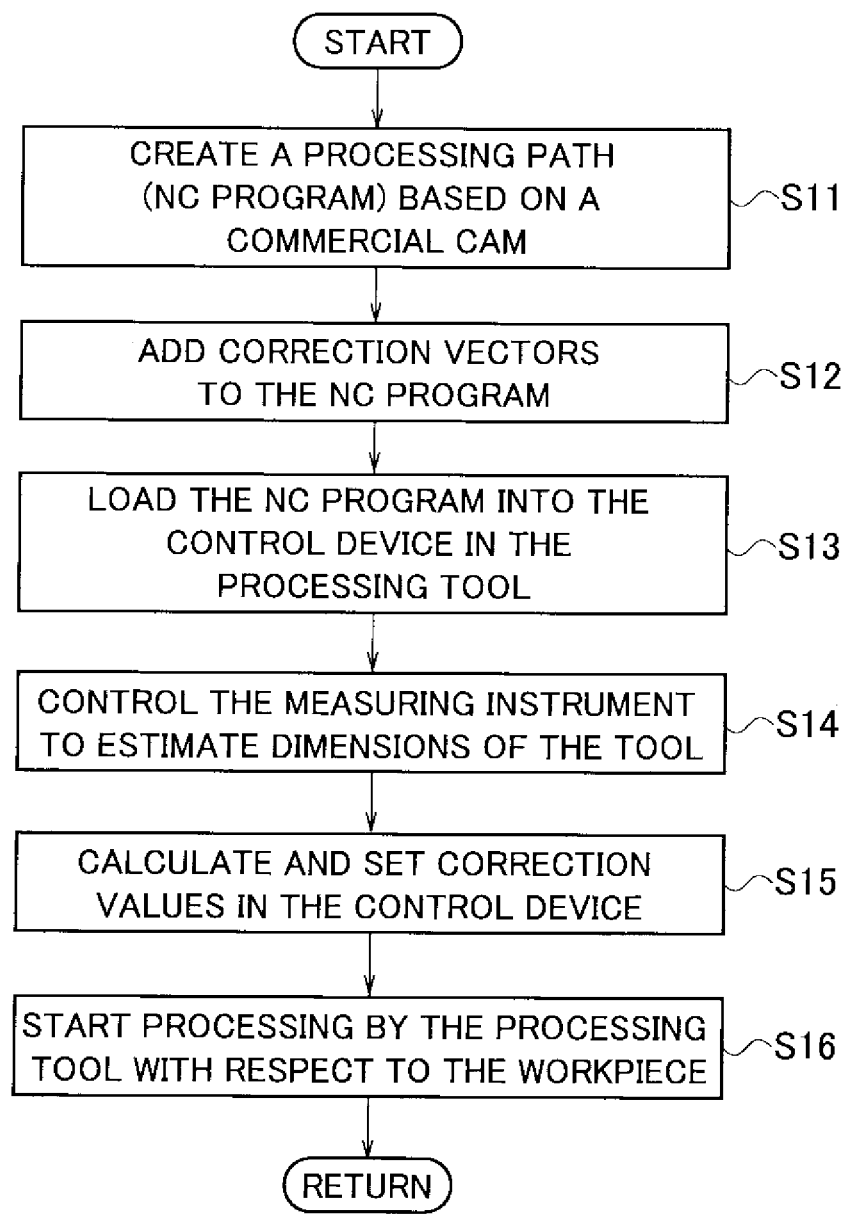
FIG. 29 is a flowchart showing steps of a process by a processing machine according to an embodiment.

Processing steps of the processing machine for the workpiece in accordance with the aforementioned first embodiment will be described with reference to a flowchart shown in FIG. 29. First, at a step S11 in FIG. 29, executed is creating the NC program at a time of processing the workpiece 5, namely three-dimensional coordinates of the processing path by the tool 3, on the basis of a commercially available CAM.

At a step S12 executed is adding the aforementioned correction vector (normal vector) to the NC program.

At a step S13 executed is loading the NC program to the control section 13 of the processing machine 1.

At a step S14 executed is measuring the shape of the tool 3 for processing the workpiece 5 with a tool shape measuring instrument using laser or such, thereby collecting the shape of the tool.

At a step S15 executed is calculating the correction values for the NC program on the basis of the shape of the tool collected at the step S14 and setting them into a memory of the control section 13.

Thereafter, at a step S16 executed is starting processing by the tool 3.

The tool 3 could be thereby operated with correcting the errors in the contour of the tool 3, thereby processing the workpiece 5.

By the processing machine 1 for the workpiece, because the arithmetic expressions for calculating the position (the coordinate values) of the tool 3 are embedded in the NC program, it is enabled to omit necessity for rewriting the NC program in each case when the tool is substituted or the tool is worn out.

More specifically, it is unavoidable to rewrite the NC program in each case when the tool is substituted or the tool is worn out if concrete numerals are used. By using the arithmetic expressions, however, case-by-case solutions could be used to deal with time changes in errors in contours of tools. Further, by using the arithmetic expressions, because measured tool contour values are stored in advance in variables and then calculation are executed at a time of processing, a once prepared NC program can be continuously used. Further, as the control section 13 executes calculation for the arithmetic expressions of the NC program, any special device is unnecessary.

Further, by the processing machine 1 for the workpiece, because the NC program is so configured as to use the arithmetic expression and then correct the position of the tool 3 to suppress creation of processing errors in the workpiece 5 caused by the errors in the contour of the tool 3, it is enabled to simplify the configuration of the NC program.

Further, by the processing machine 1 for the workpiece, the position of the already held tool 3 can be certainly and with high precision corrected because the normal vector V1 at the processing point T1 of the tool 3 is determined by using the CAD data 37 and the processing path 41 and then the arithmetic expressions including this normal vector V1 and the errors in the contour of the tool 3 at the processing point T1 is used to correct the position of the tool 3.

Meanwhile, the tool 3 becomes worn as processing of the workpiece 5 progresses. Measurement of the errors in the contour of the tool 3 is therefore preferably repeated at each predetermined time as processing of the workpiece 5 progresses.

Further, to repeat measurement of the errors in the contour of the tool 3 at each predetermined time as processing of the workpiece 5 progresses and correct the position of the tool 3 in accordance with the result of the measurement may give rise to formation of steps on the surface of the tool 5. Thus the correction values may not be changed just after the measurement of the errors in the contour of the tool 3 but be gradually changed as the processing progresses.

More specifically, to prevent a situation where the control section 13 causes the tool shape measuring device 31 at each predetermined time during processing of the workpiece 5 and steps are formed on the surface of the already held workpiece 5 before and after correction when the position of the tool 3 is corrected in accordance with the measurement results, executed may not be changing the correction values of the already held tool 3 after executing measurement of the errors in the contour of the already held tool 3 but be correcting the position of the already held tool 3 as processing of the already held workpiece 5 by the already held tool 3 progresses (starting correction of the position of the already held tool from "0" and thereafter gradually changing, increasing for example, the correction values).

Figure 35A:
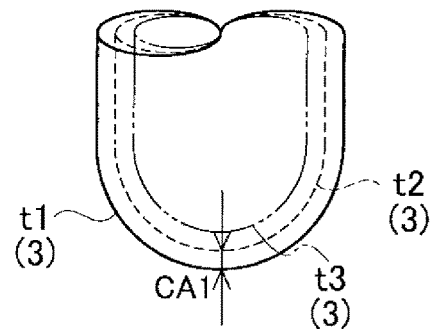
FIG. 35A is a schematic elevational view of a tool to describe a time-dependent change of its outline.

Further descriptions will be given with reference to FIGS. 35A, 35B and 35C. FIG. 35A is a schematic drawing showing outlines of the already held tool 3 measured by the tool shape measuring device 31 at times t1, t2 and t3. The time t2 shown in FIGS. 35A, 35B and 35C are later than the time t1 (a time elapsed from the time t1 for "time t2-time t1"), and the time t3 is later than the time t2.

Further, the time t1 is a time when processing of the already held workpiece 5 by the already held tool 3 starts. As shown in FIG. 35A, as the already held workpiece 5 is processed with the already held tool 3 from the time t1 through the time t3, the already held tool 3 gradually gets worn.

While in the above description the time t2 and the time t3 may be recognized as flash times, the time t2 and such substantially have some time widths. More specifically, the time t2 and such are defined to have time widths from a time when processing of the already held workpiece 5 by the already held tool 3 ends via measurement of the already held tool 3 until a time when next processing of the already held workpiece 5 by the already held tool 3 starts.

Figure 35B:
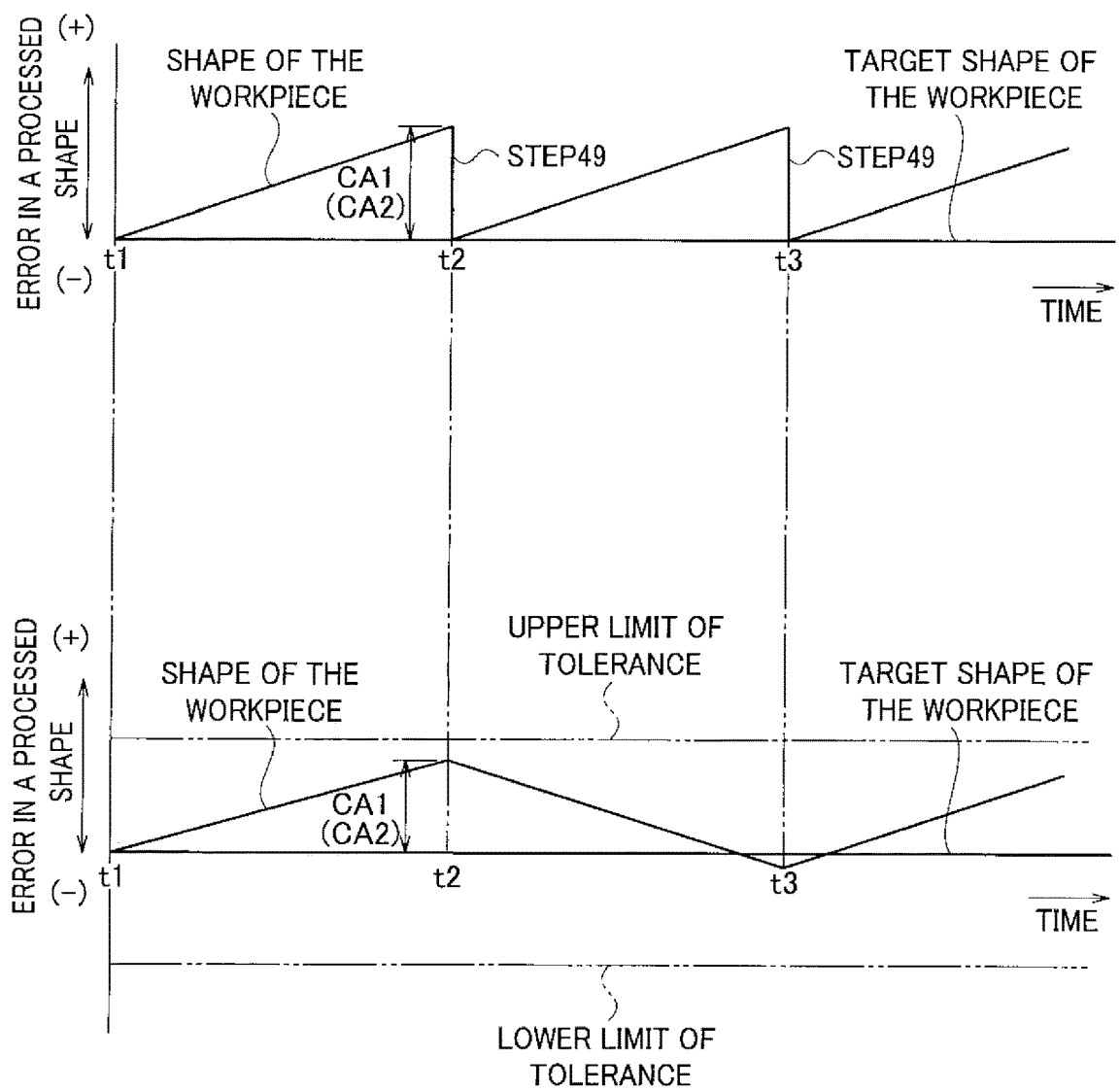
FIG. 35B is a graph of time-dependent changes in errors of processing shapes in order to compare those caused by method for correction.
Figure 35C:
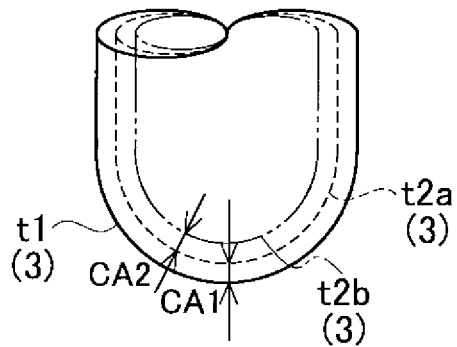
FIG. 35C is a schematic elevational view of a tool to describe an aspect in which measurement of errors in a contour is repeatedly executed.

FIG. 35B shows a shape (workpiece shape) of a surface of the already held workpiece 5 where the position of the already held tool 3 is corrected (correction allowing creation of steps) just after the errors in the contour of the already held tool 3 are measured and the already held workpiece 5 is processed with the already held tool 3. In what curved lines in FIG. 35B depict, steps 49 are formed at the times t2 and t3.

In contrast, by properly changing a correction value as processing of the already held workpiece 5 by the already held tool 3 progresses, the shape (workpiece shape) of the surface of the already held workpiece 5 comes to be a shape without formation of steps shown by a curved line at the foot of FIG. 35B. Meanwhile, the errors in shape of the already held workpiece 5 after processing shown by the curved line at the foot of FIG. 35B fall within a tolerant value.

Further describing, in the embodiment shown by the curved line at the foot of FIG. 35B, from the time t1 until the time t2, for example, processing of the already held workpiece 5 is made by the already held tool 3. Next, at the time t2, errors in the contour of the already held tool 3 are measured. Then it is supposed that the already held tool 3 is worn in a value CA1.

At the time t2, to avoid formation of the steps on the surface of the already held workpiece 5, with properly correcting the position of the already held tool 3 in accordance with the errors in the contour of the already held tool 3 measured at the time t2, processing of the already held workpiece 5 is started. Meanwhile, at the time t2, without correction on the basis of the value CA1 immediately, the processing is started.

From the time t2 until time t3, the correction value of the already held tool 3 is gradually changed as processing of the already held workpiece 5 progresses. Further, from the time t2 until the time t3, a depth of wear of the already held tool 3 at the time t3 is based on a depth of wear at the time t2 (expecting the depth of wear for example), and, with properly correcting the position of the already held tool 3, the already held workpiece 5 may be processed. At the time t3 next to the time when the errors in the contour of the already held tool 3 are measured, the shape of the already held tool 3 comes to be identical to a target shape, or be a plus shape in which it is slightly larger than the target shape, or be a minus shape in which it is slightly smaller than the target shape. The curved line at the foot of FIG. 35B becomes the minus shape.

At any time after the time t3, as with the cases of the time t1 through the time t3, the already held workpiece 5 is processed by the already held tool 3.

By the way, in the above description, while supply of the NC program to the processing machine 1 for the workpiece is made by signal sending from the external PC 33, supply of the NC program to the processing machine 1 for the workpiece may be made by means of any media such as a memory card.

Further, in the above description, while description is made about correction in a case where it has only one processing point, it may have a plurality of processing points (a plurality of processing points may simultaneously exist).

More specifically, there may be a case where correction of the position of the tool 3 based on the errors in the contour of the tool 3 is made about a plurality of processing points on the tool 3 when the workpiece 5 is processed.

Here, more detailed descriptions will be given about a case where two processing points simultaneously coexist.

Figure 10A:
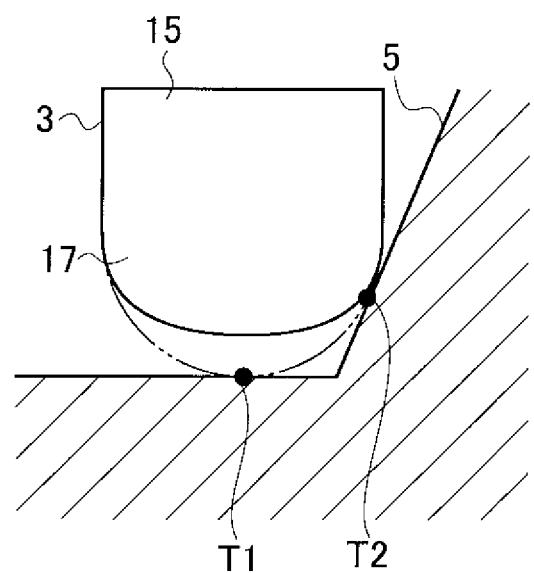
FIG. 10A is a schematic elevational partial sectional view of and around a processing point in order to describe a case of two processing points.

What is shown by a double-dot chain line in FIG. 10A is an outline of a tool in an ideal shape (a tool without any shape errors). What is shown by a solid line in FIG. 10A is an outline of the real tool 3 with shape errors.

Figure 10B:
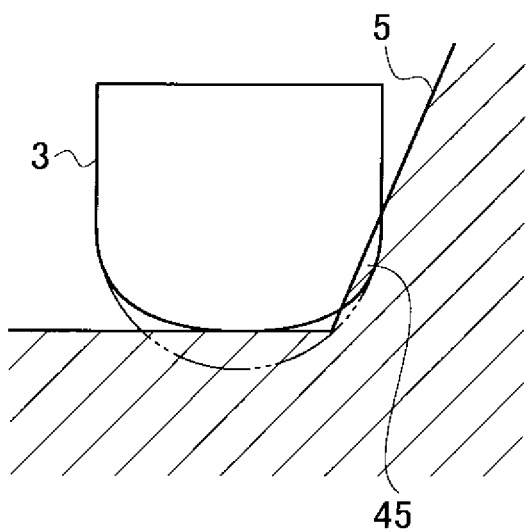
FIG. 10B is a schematic elevational partial sectional view of and around a processing point in order to describe a case where correction is made without considering interference.

If correction of the position of the tool 3 is made on the basis of the errors in the contour of the tool to correspond only with the processing point T1 as shown in FIG. 10B, it comes into an aspect shown in FIG. 10B. In the state shown in FIG. 10B, bite-ins 45 of the tool 3 into the workpiece 5 are created at and around the processing point T2. If cutting is executed in this state, the workpiece 5 is overly cut and therefore shape errors are created on the workpiece 5.

Figure 10C:
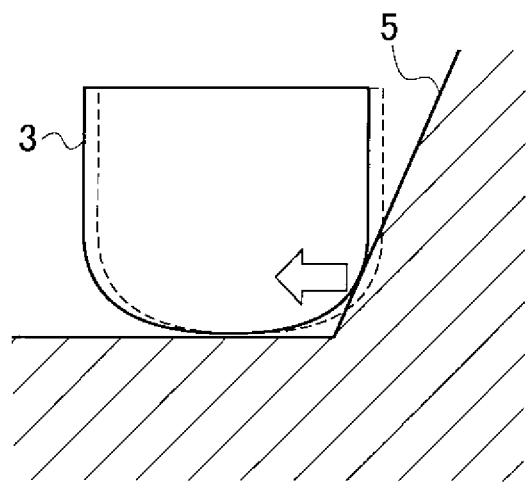
FIG. 10C is a schematic elevational partial sectional view of and around a processing point in order to describe a case where correction is made with considering interference.

Thus correction of the position of the tool 3 (prevention of interference) is made simultaneously also about the processing point T2 on the basis of the errors in the contour of the tool, it comes into an aspect shown in FIG. 10C. In FIG. 10C, from the state shown in FIG. 10B, an evasive vector (a vector existing on a plane defined by the normal vector at the processing point T1 and the processing point T2 and being perpendicular to the normal vector VB at the processing point T1) is used to correct the position of the tool 3 (see FIG. 10D).

Figure 10D:
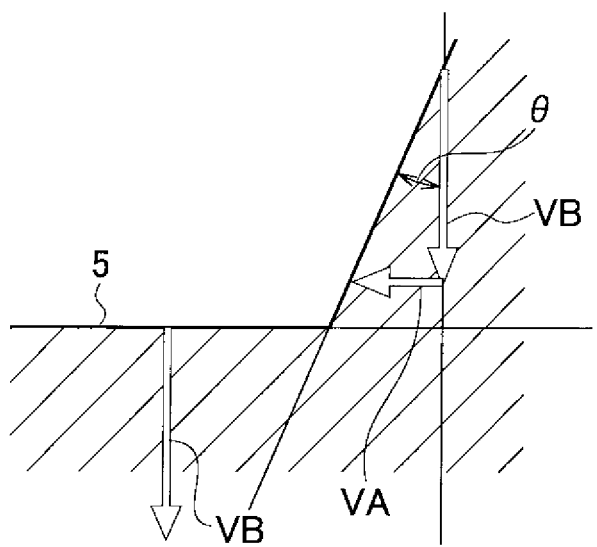
FIG. 10D is an elevational sectional view of a workpiece around a processing point in order to describe an evasive vector.

More specifically, correction is made to take the tool 3 away in a direction perpendicular to a normal line at the processing point T1 by an evasive value (a correction value at the processing point T1×tan θ) VA (see FIG. 10D). "θ" is an angle of intersection between the normal line at the processing point T1 and a plane tangent to the processing point T2 (a plane including the processing point T2 and perpendicular to the normal line at the processing point T2).

Meanwhile, what is shown by a broken line in FIG. 10C is a position of the tool 3 in FIG. 10B. The normal line at the processing point T1 and the normal line at the processing point T2 intersect with each other at the center C2 of the tip section 17 of the tool 3.

Figures 11A, 11B:
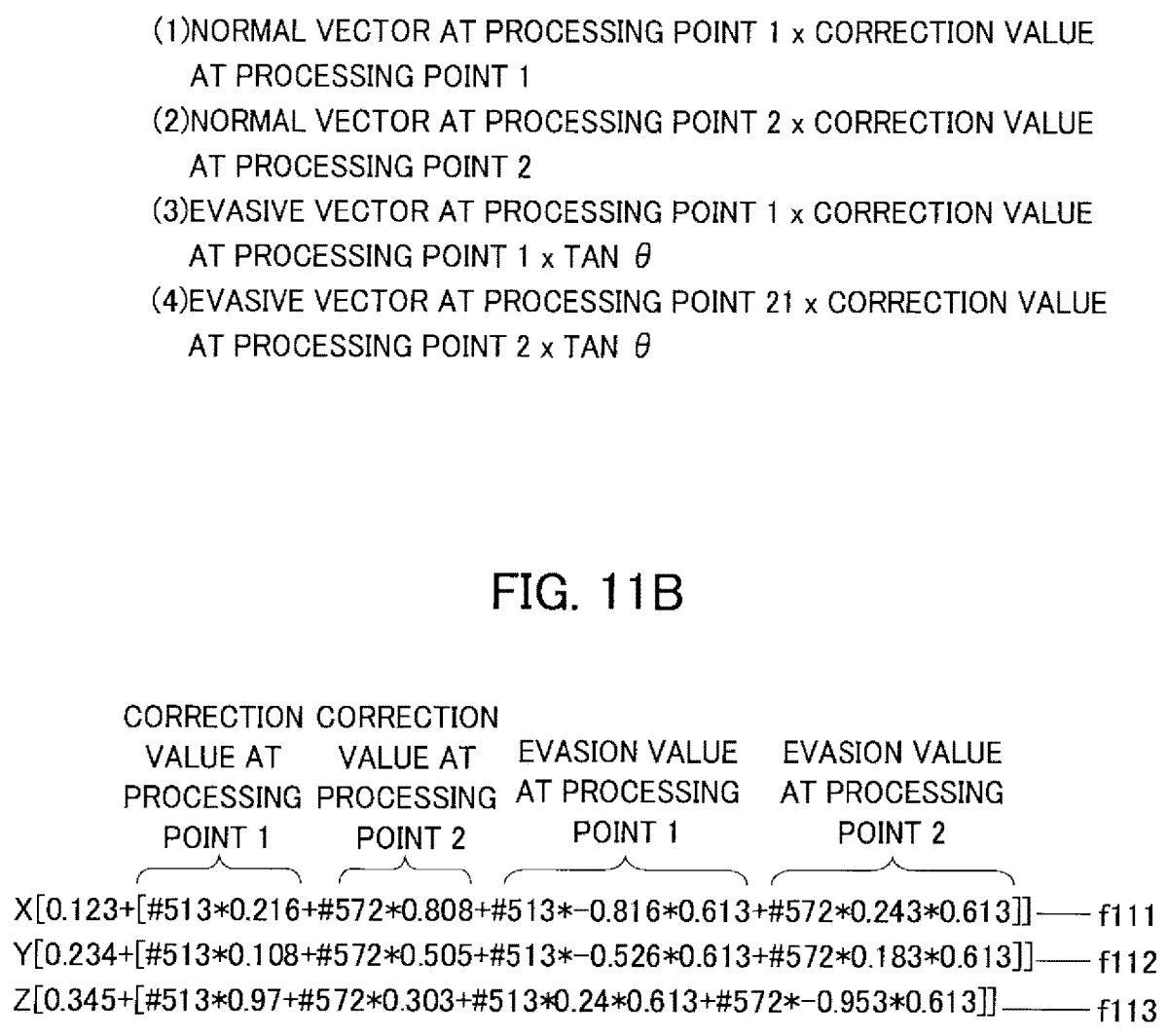

Further describing, corrected coordinates of the tool 3 in the X-direction, the Y-direction and the Z-direction are represented by a sum described in (1), (2), (3) and (4) in FIG. 11A.

The corrected coordinate value of the tool 3 in the X-direction of the tool 3 is represented by the coordinate value (arithmetic expression) f111 in FIG. 11B.

"0.123" in the coordinate value f111 is a coordinate value of the tool 3 before correction (without correction about the errors in the contour) in the X-direction. The reference sign "#513" in the coordinate value f111 is, as described already with reference to FIG. 3, the error in the contour (scalar value) of the tool 3 at the processing point T1. "0.216" in the coordinate value f111 is an X-direction component of the normal vector at the processing point T1.

The "reference sign #572" in the coordinate value f111 is, as described already with reference to FIG. 3, the error in the contour (scalar value) of the tool 3 at the processing point T2. "0.808" in the coordinate value f111 is an X-direction component of the normal vector at the processing point T2.

The "reference sign #513" in the coordinate value f111 is, as described already with reference to FIG. 3, the error in the contour (scalar value) of the tool 3 at the processing point T1. "−0.816" in the coordinate value f111 is an X-direction component of the evasion vector (unit vector) at the processing point T1. "0.613" in the coordinate value f111 is the value of tan θ as described above.

The "reference sign #572" in the coordinate value f111 is, as described already with reference to FIG. 3, the error in the contour (scalar value) of the tool 3 at the processing point T2. "0.243" in the coordinate value f111 is an X-direction component of the evasion vector (unit vector) at the processing point T2. "0.613" in the coordinate value f111 is the value of tan θ as described above.

The corrected coordinate of the tool 3 in the Y-direction is represented by the coordinate value f112 in FIG. 11B.

"0.234" in the coordinate value f112 is a coordinate value of the tool 3 before correction (without correction about the errors in the contour) in the Y-direction. The reference sign "#513" in the coordinate value f112 is, as described already with reference to FIG. 3, the error in the contour (scalar value) of the tool 3 at the processing point T1. "0.108" in the coordinate value f112 is a Y-direction component of the normal vector at the processing point T1.

The "reference sign #572" in the coordinate value f112 is, as described already with reference to FIG. 3, the error in the contour (scalar value) of the tool 3 at the processing point T2. "0.505" in the coordinate value f112 is a Y-direction component of the normal vector at the processing point T2.

The "reference sign #513" in the coordinate value f112 is, as described already with reference to FIG. 3, the error in the contour (scalar value) of the tool 3 at the processing point T1. "−0.526" in the coordinate value f112 is a Y-direction component of the evasion vector (unit vector) at the processing point T1. "0.613" in the coordinate value f112 is the value of tan θ as described above.

The "reference sign #572" in the coordinate value f112 is, as described already with reference to FIG. 3, the error in the contour (scalar value) of the tool 3 at the processing point T2. "0.183" in the coordinate value f112 is a Y-direction component of the evasion vector (unit vector) at the processing point T2. "0.613" in the coordinate value f112 is the value of tan θ as described above.

The corrected coordinate of the tool 3 in the Z-direction is represented by the coordinate value f113 in FIG. 11B.

"0.345" in the coordinate value f113 is a coordinate value of the tool 3 before correction (without correction about the errors in the contour) in the Z-direction. The reference sign "#513" in the coordinate value f113 is, as described already with reference to FIG. 3, the error in the contour (scalar value) of the tool 3 at the processing point T1. "0.97" in the coordinate value f113 is a Z-direction component of the normal vector at the processing point T1.

The "reference sign #572" in the coordinate value f113 is, as described already with reference to FIG. 3, the error in the contour (scalar value) of the tool 3 at the processing point T2. "0.303" in the coordinate value f113 is a Z-direction component of the normal vector at the processing point T2.

The "reference sign #513" in the coordinate value f113 is, as described already with reference to FIG. 3, the error in the contour (scalar value) of the tool 3 at the processing point T1. "0.24" in the coordinate value f113 is a Z-direction component of the evasion vector (unit vector) at the processing point T1. "0.613" in the coordinate value f113 is the value of tan θ as described above.

The "reference sign #572" in the coordinate value f113 is, as described already with reference to FIG. 3, the error in the contour (scalar value) of the tool 3 at the processing point T2. "−0.953" in the coordinate value f113 is a Z-direction component of the evasion vector (unit vector) at the processing point T2. "0.613" in the coordinate value f113 is the value of tan θ as described above.

Meanwhile, as the normal vector at the processing point T1 and the evasion vector are perpendicular to each other, the component (0.216, 0.108, 0.97) of the normal vector at the processing point T1 in FIG. 11B and the component (−0.816, −0.526, 0.24) of the evasion vector at the processing point T1 in FIG. 11B have the following relation (inner product=0).

More specifically, it is held that: (0.216)×(−0.816)+(0.108)×(−0.526)+(0.97)×(0.24)≈0. About the processing point T2, similarly, it is held that: (0.808)×(0.243)+(0.505)×(0.183)+(0.303)×(−0.953)≈0.

Figures 12, 13:
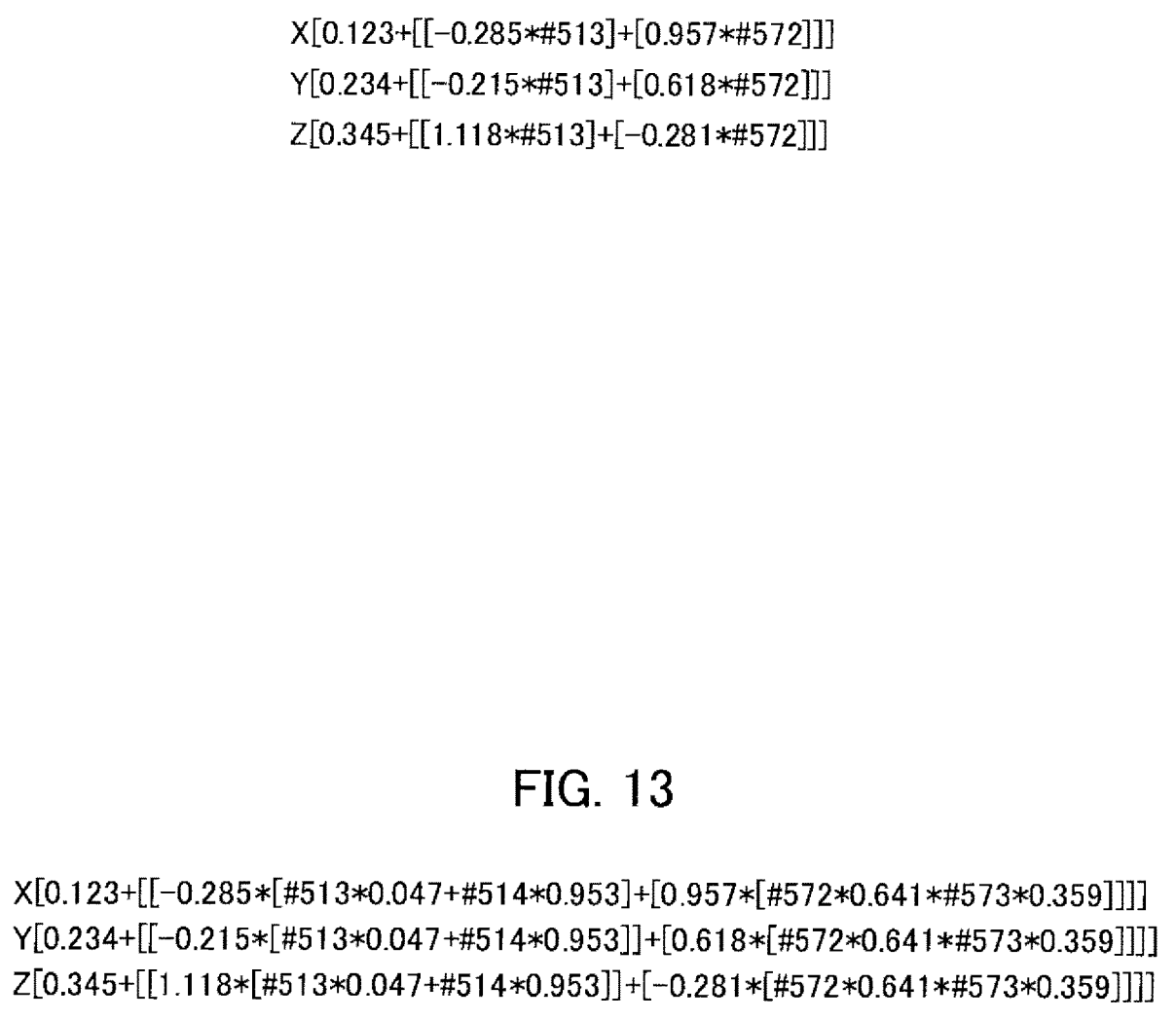

Meanwhile, the arithmetic expression shown in FIG. 12 is given from the arithmetic expression shown in FIG. 11B and thereby boosts the processing speed of the program.

Meanwhile, while FIG. 11 and FIG. 12 express concrete values, the aspect shown in FIG. 11 could be expressed as those shown in FIGS. 14A and 14B, and the aspect shown in FIG. 12 could be expressed as that shown in FIG. 15.

By the processing machine 1 for the workpiece, because correction of the position of the already held tool 3 on the basis of the errors in the contour of the tool is executed about a plurality of processing points, the tool 3 is prevented from biting in the workpiece 5 (to prevent creation of the situation shown in FIG. 10B) and thereby the workpiece 5 with high shape precision can be obtained.

Meanwhile, also in a case where three or more processing points simultaneously exist, it could be considered as with the case where two processing points simultaneously exist.

By the way, in the aspect shown in FIG. 3, the errors in the contour of the tool 3 are determined in one degree. More specifically, spots of the tool 3, errors of which are to be determined, are selected discretely (discontinuously) at each one degree for example.

Thus, in a case where the processing point T1 (T2) becomes a spot of the tool 3 where no error in the contour exists, the position of the tool 3 is to be corrected by using two spots adjacent to each other with having the processing point T1 (T2) interposed therebetween to calculate the errors in the contour of the processing point T1 (T2) and then using the calculated errors in the contour.

Figure 7:
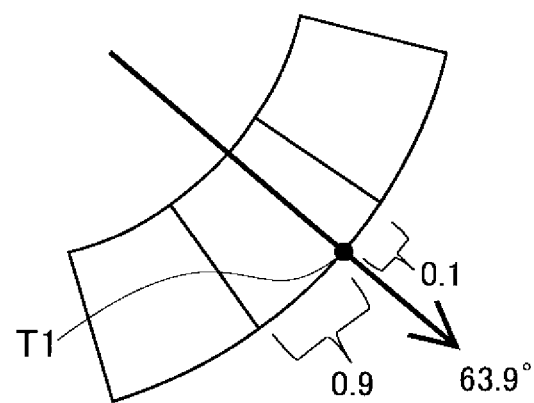
FIG. 7 is a schematic elevational view of the tool around a processing point for describing the processing point in the tool.

Describing in more detail, the errors in the contour of the tool 3 are, as being described with reference to FIG. 3, determined at each one degree in the angle of intersection relative to the rotational central axis C1 of the tool 3. However, in practice, it may be naturally a case where the processing point T1 of the tool 3 falls at the angle of 63.9 degrees for example as shown in FIG. 7.

In this case, the error in the contour of the tool 3 at the angle of 63.9 degrees (the midway angle) is obtained by using the reference sign "#563" showing the errors in the contour of the tool 3 at one angle of 63 degrees adjacent to the midway angle and the reference sign "#564" showing the errors in the contour of the tool 3 at another angle of 64 degrees adjacent to the midway angle. In this case, the reference sign "#564" showing the errors in the contour at the angle of 64 degrees that is, among the one angle of 63 degrees and the another angle of 64 degrees, closer to the midway angle of 63.9 degrees is weighed more.

Describing with a concrete example, a first difference 0.9 degrees is calculated from the midway angle 63.9 degrees and the one angle 63 degrees, and a second difference 0.1 degrees is calculated from the another angle 64 and the midway angle 63.9.

Further, "0.9" as a first ratio of a first difference 0.9 degrees relative to 1 degree as the difference between the another angle 64 degrees and the one angle 63 degrees, and "0.1" as a second ratio of a second difference 0.1 degrees relative to 1 degree as the difference between the another angle 64 degrees and the one angle 63 degrees are obtained.

The errors in the contour of the tool at the midway angle 63.9 degrees can be obtained from the sum of the first ratio 0.9×the reference sign "#564" showing the errors in the contour of the tool at the another angle 64 degrees with the second ratio 0.1×the reference sign "#563" showing the errors in the contour of the tool at the one angle 63 degrees. The coordinate value of the already held tool 3 when correcting the errors in the contour of the tool at the midway angle 63.9 degrees will be described with reference to an example of the coordinate value f81 shown in FIG. 8.

"−1.60657" at the coordinate value f81 is a coordinate value in the X-direction of the already held tool before being corrected (without any correction of the errors in the contour). "−0.89101" at the coordinate value f81 is an X-direction component of the normal vector at the processing point T1 of the coordinate value f81.

The reference sign "#563" at the coordinate value f81 is an error in the contour (scalar value) of the already held tool 3 at the processing point T1 as described with reference to FIG. 3. "0.046" in the coordinate value f81 is a value (ratio) corresponding to the second ratio "0.1" as described above.

The reference sign "#564" at the coordinate value f81 is an error in the contour (scalar value) of the already held tool 3 at the processing point T1 as described with reference to FIG. 3. "0.954" in the coordinate value f81 is a value (ratio) corresponding to the first ratio "0.9" as described above.

"−0.42583" at the coordinate value f81 is a coordinate value in the Y-direction of the already held tool 3 before being corrected (without any correction of the errors in the contour). "0.11528" at the coordinate value f81 is a Y-direction component of the normal vector at the processing point T1 of the coordinate value f81.

The reference sign "#563" at the coordinate value f81 is an error in the contour (scalar value) of the already held tool 3 at the processing point T1 as described with reference to FIG. 3. "0.046" in the coordinate value f81 is a value (ratio) corresponding to the second ratio "0.1" as described above.

The reference sign "#564" at the coordinate value f81 is an error in the contour (scalar value) of the already held tool 3 at the processing point T1 as described with reference to FIG. 3. "0.954" in the coordinate value f81 is a value (ratio) corresponding to the first ratio "0.9" as described above.

"−1.09809" at the coordinate value f81 is a coordinate value in the Z-direction of the already held tool 3 before being corrected (without any correction of the errors in the contour). "−0.4391" at the coordinate value f81 is a Z-direction component of the normal vector at the processing point T1 of the coordinate value f81.

The reference sign "#563" at the coordinate value f81 is an error in the contour (scalar value) of the already held tool 3 at the processing point T1 as described with reference to FIG. 3. "0.046" in the coordinate value f81 is a value (ratio) corresponding to the second ratio "0.1" as described above.

The reference sign "#564" at the coordinate value f81 is an error in the contour (scalar value) of the already held tool 3 at the processing point T1 as described with reference to FIG. 3. "0.954" in the coordinate value f81 is a value (ratio) corresponding to the first ratio "0.9" as described above.

The coordinate value f82, the coordinate value f83, the coordinate value f84, the coordinate value f85 . . . are construed in a way similar to the coordinate value f81.

Figure 8:
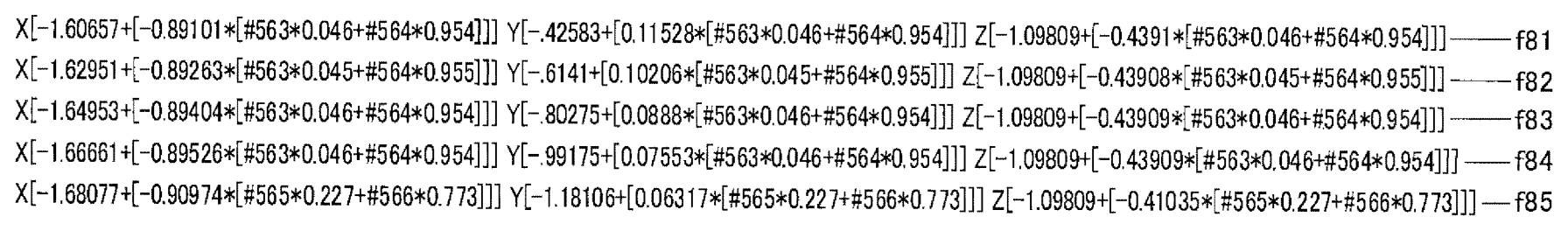

As the errors about the contour of the tool 3 are corrected (the errors in the contour of the tool 3 are corrected at the midway angle), the tool 3 passes through the coordinate value f81, the coordinate value f82, the coordinate value f83, the coordinate value f84, the coordinate value f85 . . . , as shown in FIG. 8, in this order and then executes cutting of the workpiece 5.

Figures 9A, 9B:
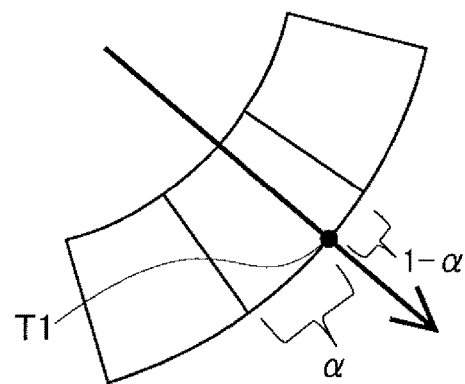
FIG. 9A is a schematic elevational view of a tool around a processing point to give generalized expression to the processing point.
FIG. 9B is an example of corrected positional coordinates to give generalized expression to the processing point.

Meanwhile, while concrete values are exemplified in FIGS. 7 and 8, the aspect shown in FIG. 7, if generalized, comes to be what is shown in FIG. 9A and the aspect shown in FIG. 8, if generalized, comes to be what is shown in FIG. 9B. Further, in a case where two processing points exist, it comes to be what is shown in FIG. 13. The aspect shown in FIG. 13, if generalized, comes to be what is shown in FIG. 16.

By the processing machine 1 for the workpiece, as the spots of the tool 3 where errors in the contour are to be obtained are selected discretely (discontinuously) and, even if the processing point T1 (T2) exists on a spot of the tool 3 where the errors in the contour do not exist, the errors in the contour at the processing point T1 (T2) are calculated by using the errors in the contour at two spots adjacent to each other with having the processing point T1 (T2) interposed therebetween and the position of the tool 3 is corrected by using the obtained errors in the contour, creation of the steps on the surface of the workpiece is prevented and the workpiece 5 with better shape precision can be obtained.

By the way, in the processing machine 1 for the workpiece, the position of the tool 3 may be corrected on the basis of errors in the contour after being filtered.

More specifically, a curve showing the errors in the contour of the tool 3 (a curve showing the errors in the contour as measured practically) is filtered to remove its high-frequency components for example by changing cutoff frequencies (cutoff values) for the errors in the contour of the tool 3 depending on radii of the surface to be processed of the workpiece 5 relative to radii of an arc portion of the tool 3, and on the basis of the filtered errors in the contour the position of the tool 3 may be corrected.

Describing this in more detail, the errors in the contour of the already held tool 3 are obtained at each one degree in the description with reference to FIG. 3. By the way, if the errors in the contour of the already held tool 3 are measured by more small intervals, namely at each 0.1 degree, rippled errors in the contour as shown by a curved line CV1 in FIG. 19A can be obtained.

Figure 19A:
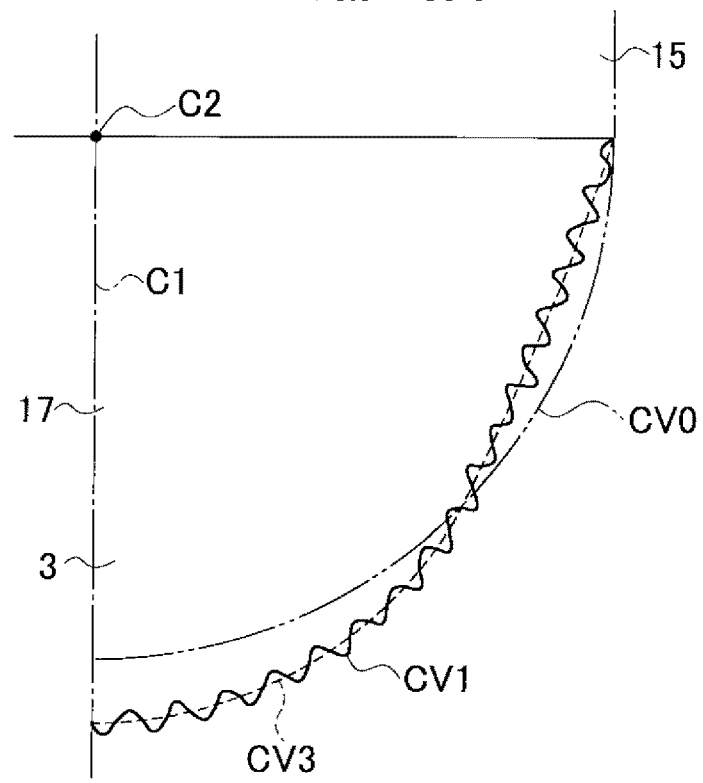
FIG. 19A is a schematic elevational view of a tool to describe an example for measuring errors in a contour at relatively small intervals.
Figure 19B:
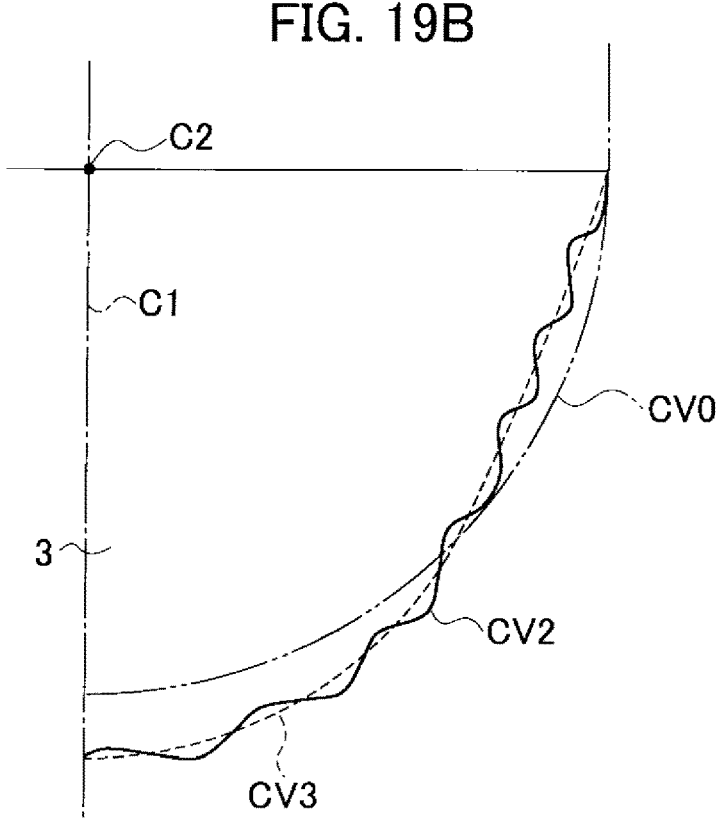
FIG. 19B is a schematic elevational view of a tool to describe an example of errors in a contour from which high-frequency components are removed.

If the curved line CV1 shown in FIG. 19A is filtered to remove high-frequency components, a curved line CV2 shown in FIG. 19B, waved to some degree, can be obtained.

Further, if the curved line CV2 shown in FIG. 19B is filtered to remove high-frequency components with longer wavelength (mid-frequency components) than the aforementioned high-frequency components, a curved line CV3 shown in FIGS. 3 and 19, very little waved, can be obtained.

Figure 18A:
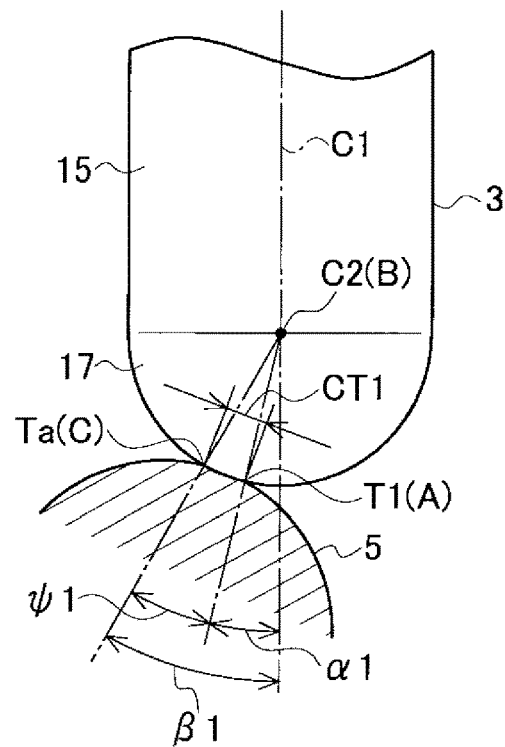
FIG. 18A is a schematic elevational partial sectional view of and around a processing point in order to describe a range where a workpiece is processed about an example where a contact area between a tool and a surface subject to processing is relatively small.

Meanwhile, a curved line CV0 in an arc shape shown in FIGS. 3 and 19 depicts an outline shape of the already held tool 3 without errors. Further, the aspects shown in FIGS. 3, 10, 19 and such are of course exemplary illustrations and the errors are exaggerated therein As shown in FIG. 18A, in a case where a value in a difference between a radius of the arc of the tool 3 and a radius of a surface to be processed of the workpiece 5 is large, a value of a contact length (contact area) CT1 between the workpiece 5 and the tool 3 comes to be small and therefore correction is executed by using the errors in the contour shown by the curved line CV1 in FIG. 19A.

Figure 18B:
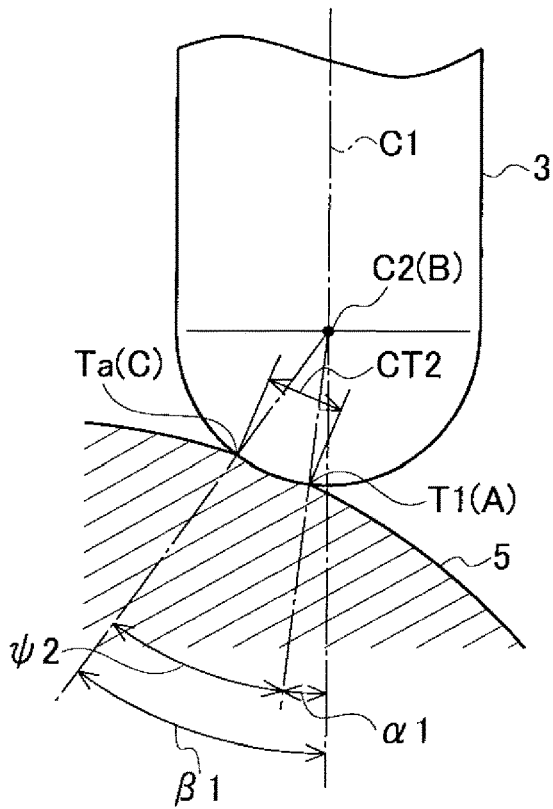
FIG. 18B is a schematic elevational partial sectional view of and around a processing point in order to describe a range where a workpiece is processed about an example where a contact area between a tool and a surface subject to processing is moderate.

As shown in FIG. 18B, in a case where the value in the difference between the radius of the arc of the tool 3 and the radius of the surface to be processed of the workpiece 5 is moderate, the value of the contact length (contact area) CT2 between the workpiece 5 and the tool 3 comes to be moderate and therefore correction is executed by using the errors in the contour shown by the curved line CV2 in FIG. 19B.

Figure 18C:
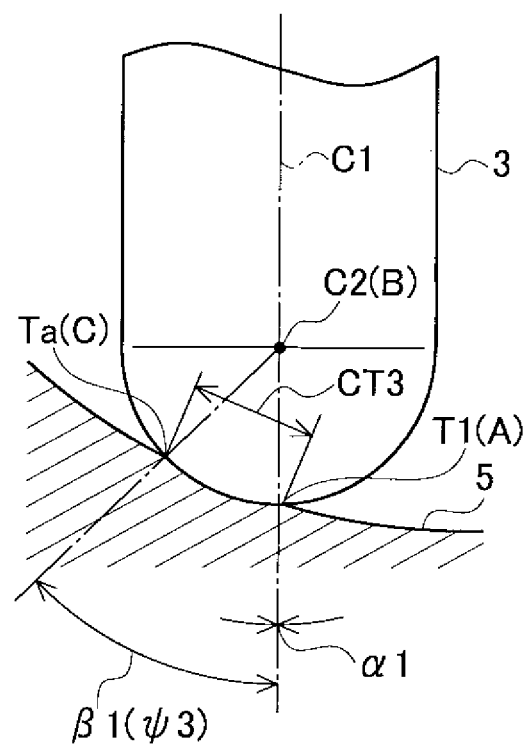
FIG. 18C is a schematic elevational partial sectional view of and around a processing point in order to describe a range where a workpiece is processed about an example where a contact area between a tool and a surface subject to processing is relatively large.

Further as shown in FIG. 18C, in a case where the value in the difference between the radius of the arc of the tool 3 and the radius of the surface to be processed of the workpiece 5 is small, the value of the contact length (contact area) CT3 between the workpiece 5 and the tool 3 comes to be large and therefore correction is executed by using the errors in the contour shown by the curved line CV3 in FIG. 19C.

Here, the value in the difference between the radius of the arc of the tool 3 and the radius of the surface to be processed of the workpiece 5 will be described. The arc of the tip section 17 of the tool 3 is in a convex shape with a constant radius. In contrast, the surface to be processed of the workpiece 5 may be either in a convex shape, a planar shape, or a concave shape.

In a case where the surface to be processed of the workpiece 5 is in a convex shape, smaller radii in the convexity (absolute values of the radii) cause larger values in the difference between the radius of the arc of the tool (absolute value of the radius) and the radius of the surface to be processed of the workpiece 5.

In a case where the surface to be processed of the workpiece 5 is in a planar shape, the value in the difference between the radius of the arc of the tool 3 (absolute value of the radius) and the radius of the surface to be processed of the workpiece 5 comes to be smaller than the case where the surface to be processed of the workpiece 5 is in a convex shape.

In a case where the surface to be processed of the workpiece 5 is in a concave shape, the value in the difference between the radius of the arc of the tool 3 (absolute value of the radius) and the radius of the surface to be processed of the workpiece 5 comes to be smaller than the case where the surface to be processed of the workpiece 5 is in a planar shape.

Further, in a case where the surface to be processed of the workpiece 5 is in a concave shape, as the radius of the concavity gets smaller to be closer to the radius of the arc of the tool 3, the value in the difference between the radius of the arc of the tool 3 and the radius of the surface to be processed of the workpiece 5 gets smaller.

By such a processing machine 1 for a workpiece, because a curve showing errors in a contour of the tool 3 is filtered with changing a cut-off frequency of the errors in the contour of the tool 3 in accordance with a radius of a surface to be processed of the workpiece 5 and the position of the already held tool 3 is corrected on the basis of the filtered errors in the contour, correction could be executed even with considering wear of the tool 3 at points adjacent to the processing point T1 (T2).

Meanwhile, aside from such filtering, a method for changing widths for removing convexity and concavity by changing ranges for averaging in accordance with curvatures may be used.

More specifically, according to a radius of a surface to be processed of the already held workpiece 5 relative to a radius of the arc section of the tool 3, by changing ranges for averaging at a time of averaging the errors in the contour of the tool 3, the curve showing the errors in the contour of the tool 3 can be averaged and then, with using the averaged errors in the contour, the position of the tool 3 can be corrected.

Describing in more detail, the point T1 in FIG. 18A depicts a processing point and the tool 3 is, between the processing point (one end point) T1 and a point (another end point) Ta (a range with a small value CT1), in contact with the workpiece 5. In the state shown in FIG. 18A, the errors in the contour of the arc of the tool 3 are averaged in the range CT1 of an angle ∠ABC (ψ1) defined by the processing point T1, the center C2 of the tip section 17 of the tool 3 and the point Ta.

Average calculation in the range of the angle ∠ABC, a mean value Rav of the radius of the arc of the tip section 17 of the tool 3 (an average in the range of the angle ∠ABC) can be obtained. The mean value Rav can be obtained from "$R_{av}=\{\int rd\psi\}/\psi 1$" for example, if the points of the tool, the errors in the contour of which are obtained, exist in a state where they are continuous. And, by using the mean value Rav of the tool 3, the workpiece 5 is processed.

As with the case shown in FIG. 18A, the point T1 shown in FIG. 18B depicts a processing point and the tool 3 is, between the processing point T1 and a point Ta (a range with a moderate value CT2), in contact with the workpiece 5. In the state shown in FIG. 18B, the errors in the contour of the arc of the tool 3 are averaged in the range CT2 of an angle ∠ABC (ψ2) defined by the processing point T1, the center C2 of the tip section 17 of the tool 3 and the point Ta.

Average calculation in the range of the angle ∠ABC, a mean value Rav of the radius of the arc of the tip section 17 of the tool 3 (an average in the range of the angle ∠ABC) can be obtained. The mean value Rav can be, as described above, obtained from "$R_{av}=\{\int rd\psi\}/\psi 2$" for example. And, by using the mean value Rav of the tool 3, the workpiece 5 is processed.

Further, as with the case shown in FIG. 18A, the point T1 shown in FIG. 18C depicts a processing point and the tool 3 is, between the processing point T1 and a point Ta (a range with a large value CT3), in contact with the workpiece 5. In the state shown in FIG. 18C, the errors in the contour of the arc of the tool 3 are averaged in the range CT3 of an angle ∠ABC Op) defined by the processing point T1, the center C2 of the tip section 17 of the tool 3 and the point Ta.

Average calculation in the range of the angle ∠ABC, a mean value Rav of the radius of the arc of the tip section 17 of the tool 3 (an average in the range of the angle ∠ABC) can be obtained. The mean value Rav can be, as described above, obtained from "$R_{av}=\{\int r d\psi\}/\psi 3$" for example. And, by using the mean value Rav of the tool 3, the workpiece 5 is processed.

Meanwhile, as being understood from the above description, the range of average calculation when the errors in the contour of the tool 3 are averaged gets broader as the contact length between the workpiece 5 and the already held tool 3 gets larger.

Spots of average calculation when the errors in the contour of the tool 3 are averaged are to be spots around the processing point T1 including the processing point T1. They may be for example spots having the processing point T1 as these end but may be spots having the processing point T1 as a midway point.

Further, while the range for average calculation of the errors in the contour of the tool 3 is consistent with a range where the workpiece 5 is in contact with the tool 3, it may be different from the range where the workpiece 5 is in contact with the tool 3.

The range for average calculation of the errors in the contour of the tool 3 may be for example narrower or broader than the range where the workpiece 5 is in contact with the tool 3.

Further, the range for average calculation of the errors in the contour in FIG. 18A is for example a range defined by α1=20°, β1=25°, the range for average calculation of the errors in the contour in FIG. 18B is for example a range defined by α1=10°, β1=30°, and the range for average calculation of the errors in the contour in FIG. 18C is for example a range defined by α1=0°, β1=45°.

By the way, if a curvature radius of a section to be processed of the workpiece 5 becomes close to a curvature radius of the tool, as shown in FIG. 18C, the range for cutting becomes broader and a range of adjacent sections changes. If the curvature radius of the section to be processed of the workpiece 5 gets away from the curvature radius of the tool 3, as shown in FIG. 18A, the range for cutting becomes narrower and the range of adjacent sections also changes.

Thus, when the position of the tool 3 is to be corrected, the range for cutting is also determined so as to assign a proper correction table. More specifically, in a case where the range for cutting is broad as shown in FIG. 18C, the position of the tool 3 is corrected by using the outline shape shown by the curved line CV3 in FIG. 3, in a case where the range for cutting is moderate as shown in FIG. 18B, the position of the tool 3 is corrected by using the outline shape shown by the curved line CV2 in FIG. 19B, and in a case where the range for cutting is narrow as shown in FIG. 18A, the position of the tool 3 is corrected by using the outline shape shown by the curved line CV1 in FIG. 19A.

Thereby correction of the tool 3 can be carried out in a way considering the adjacent sections of the processing point T1 (T2) of the tool 3, and therefore it is enable to obtain the workpiece 5 with shape precision.

Further, in the processing machine 1 for the workpiece, correction of the position of the tool 3 may be carried out by using the errors in the contour of the tool 3 at the processing point T1 (T2) or around the processing point T1 (T2) in accordance with a shape tolerance of the workpiece 5 at the processing point T1 (T2).

Figure 20:
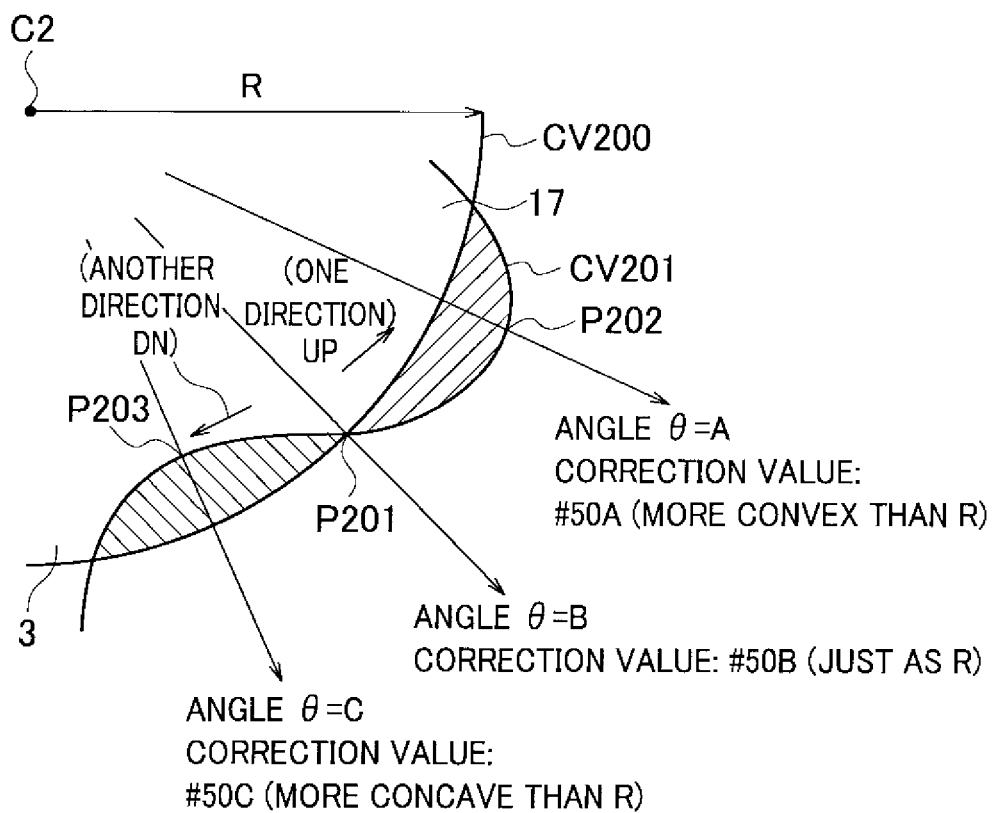
FIG. 20 is a schematic elevational view of a tool to describe an example of errors in a contour around a processing point.

More detailed descriptions about this will be provided. An ideal shape of the tool 3 is shown in FIG. 20 by an arc CV200 and a shape with errors in a contour of the already held tool 3 is shown by a curved line CV201. A processing point is defined by P201. At this processing point P201, the errors in the contour of the already held tool 3 comes to be "0" for example.

At one side of the processing point P201 (the side shown by a reference sign UP), the errors in the contour of the tool 3 have positive values (the outline of the tool 3 projects relative to the ideal shape). At another side of the processing point P201 (the side shown by a reference sign DN), the errors in the contour of the tool 3 have negative values (the outline of the tool 3 recedes from the ideal shape).

Figure 21A:
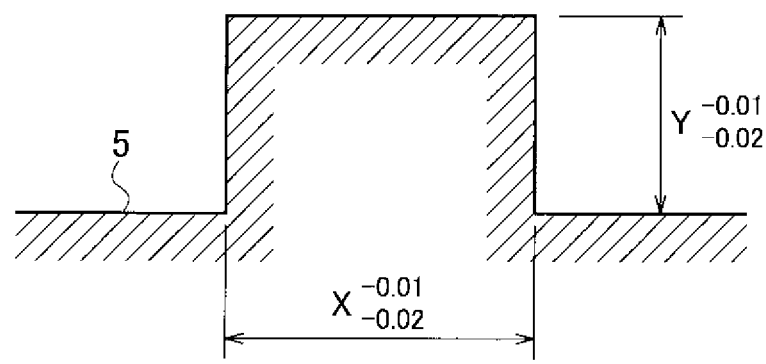
FIG. 21A is a schematic elevational view of a workpiece to describe an example for using errors in a contour to correct positional coordinates.

As shown in FIG. 21A, in a case where the workpiece 5 is formed with a minus tolerance, the position of the tool 3 is corrected by using the errors in the contour of the tool 3 around the another side of the processing point P201 (for example, using the most receding point P203) to carry out cutting the workpiece 5.

Figure 21B:
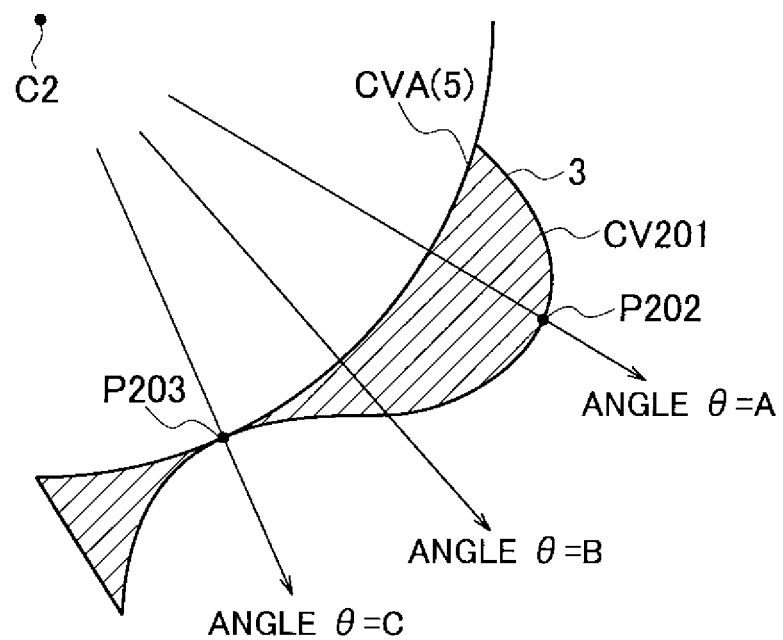
FIG. 21B is a schematic elevational view of a tool and a workpiece, which depicts a relation between a contour of a tool and a targeted surface of a workpiece on the basis of the example shown in FIG. 21A.

More specifically, as shown in FIG. 21B, the point P203 is set in contact with the surface to be processed (a targeted surface to be treated CVA) of the workpiece 5 and then cutting the workpiece 5 is carried out. Thereby the cut-in depth of the tool 3 into the workpiece 5 becomes larger than that in the case where the errors in the contour of the tool 3 are non-existent and thus the workpiece 5 is formed with a minus tolerance as shown in FIG. 21A.

Figure 22A:
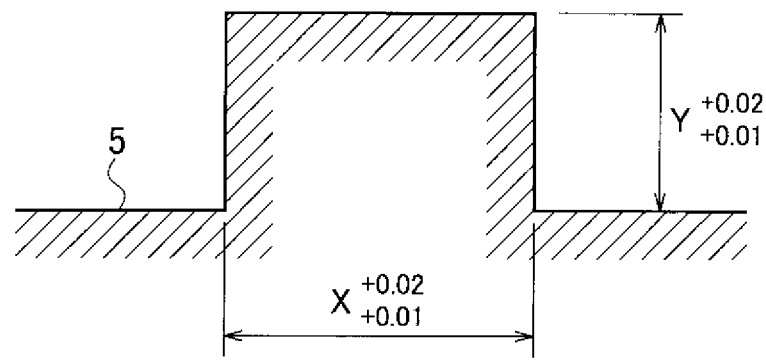
FIG. 22A is a schematic elevational view of a workpiece to describe another example for using errors in a contour to correct positional coordinates.

On the other hand, as shown in FIG. 22A, in a case where the workpiece 5 is formed with a plus tolerance, the position of the tool 3 is corrected by using the errors in the contour of the tool 3 around the one side of the processing point P201 (for example, using the most projecting point P202) to carry out cutting the workpiece 5.

Figure 22B:
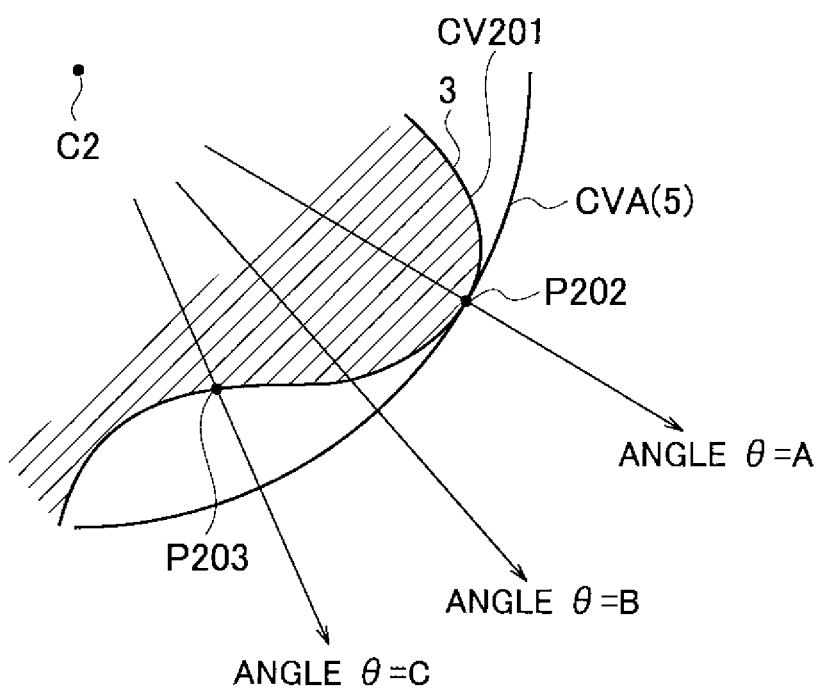
FIG. 22B is a schematic elevational view of a tool and a workpiece, which depicts a relation between a contour of a tool and a targeted surface of a workpiece on the basis of the example shown in FIG. 22A.

More specifically, as shown in FIG. 22B, the point P202 is set in contact with the surface to be processed (a targeted surface to be treated CVA) of the workpiece 5 and then cutting the workpiece 5 is carried out. Thereby the cut-in depth of the tool 3 into the workpiece 5 becomes smaller than that in the case where the errors in the contour of the tool 3 are non-existent and thus the workpiece 5 is formed with a plus tolerance as shown in FIG. 22A.

By such a processing machine 1 for a workpiece, because the position of the already held tool 3 is corrected by using the errors in the contour of the tool 3 at the processing point or the errors in the contour of the tool 3 around the processing point in accordance with the shape tolerance of the workpiece 5, even if the wear of the tool 3 does not uniformly progress for example (depths of wear of the tool 3 depend on portions on the tool 3), the proper workpiece with a shape precision can be obtained.

More specifically, wear on a tool by processing a workpiece does not uniformly progress, it depends on angles and cutting depths, and, as a property of an end mill 3, its central portion hardly wears, and thereby the tool will deform as it is used.

If correction values are determined not by a shape after wearing but only by depths of wear, as supplement of cut-in depths is made by the deformed tool 3, surplus cutting in would occur at adjacent portions of the processing point and therefore it gives rise to deterioration of the shape precision of the workpiece 5.

Thus, if the required processing precision is the minus tolerance (see FIG. 21A), the priority is given in regard to cut-in (see FIG. 21B), if the required processing precision is the plus tolerance (see FIG. 22A), the priority is given in regard to cut-out (see FIG. 22B), and if an absolute precision is required, by averaging correction values in the vicinities and determining a correction value, a function for finely adjusting correction values ca be obtained.

By the way, there may be a case where, if the tool 3 is replaced or subject to truing during processing of a single workpiece 5, change in the shape of the tool 3 causes creation of steps on a surface of the workpiece 5. Then creation of steps can be prevented by measuring the shape of the tool 3 before replacement of the tool 3 or truing, measuring the shape of the tool 3 after replacement or truing, determining difference of the shapes, and determining a correction value to simulate wear before the replacement.

More specifically, it may be modified so that the control section 13 makes the tool shape measurement device 31 measure the already held tool 3 both just before and just after replacing the already held tool 3 and then determines the difference of the shapes between these two states.

Or, it may be modified so that the control section 13 makes the tool shape measurement device 31 measure the already held tool 3 both just before truing the already held tool 3 and just after truing the already held tool 3 and then determines the difference of the shapes between these two states.

And, the control section 13 may be so constituted as to correct the position of the already held tool 3 in accordance with the determined difference of the shapes of the already held tools (the correction of the position of the already held tool starts from "0" and is gradually changed to increase for example) in order to prevent creation of steps on the surface of the already held workpiece 5, which is caused by replacing or truing the already held tool 3.

Describing further, the state just before replacing the already held tool 3 means a state where the already held tool 3 finishes processing the already held workpiece 5 and the already held tool 3 does not anymore process the already held workpiece 5. The state just after replacing the already held tool 3 means a state where the already held tool 3 has been replaced and the already held tool 3 has not processed the already held workpiece 5 before.

The state just before truing the already held tool 3 means a state where the already held tool 3 finishes processing the already held workpiece 5 and the already held tool 3 does not anymore process the already held workpiece 5. The state just after truing the already held tool 3 means a state where truing of the already held tool 3 has been carried out and the already held tool 3 has not processed the already held workpiece 5 before.

Description about replacement of the already held tool 3 will be further given with reference to FIGS. 35A, 35B and 35C.

What the reference sign t1 in FIG. 35A depicts shows a shape of an already held tool (unused or new already held tool for example) 3 just after replacement. What the reference sign t2 in FIG. 35A depicts shows a shape of an already held tool 3 just before replacement. The already held tool 3 shown by the reference sign t2 is, as it has processed the already held workpiece 5, worn as compared with that by the reference sign t1 in FIG. 35A and a tool shape difference CA1 is created.

Meanwhile, while also in the above description the time t2 and the time t3 may be recognized as flash times, the time t2 and such substantially have some time widths.

The curved line at the head of FIG. 35B depicts the shape of the surface of the already held workpiece 5 when the already held workpiece 5 is processed with the already held tool 3 without correcting the position of the already held tool 3 in accordance with the replacement of the already held tool 3.

Meanwhile, for convenience of explanation, in the embodiment shown by the curved line at the head of FIG. 35B, the already held tool 3 is replaced and renewed at the times of t1, t2 and t3. Further, it is supposed that there are no shape errors among the already held tool 3 renewed at the time t1, the already held tool 3 renewed at the time t2 and the already held tool 3 renewed at the time t3. In the embodiment shown by the curved line at the head of FIG. 35B, the steps 49 are formed at the times t2, t3 when the already held tool 3 is replaced.

In contrast, by properly correcting the position of the already held tool 3 in accordance with the difference of the shapes of the already held tools 3, the shape of the surface of the already held workpiece 5 (work shape) comes to be a shape as shown by the curved line at the foot of FIG. 35B without forming steps. Meanwhile, the error in the shape of the already held workpiece 5 after being processed shown by the curved line at the foot of FIG. 35B fall within a tolerance.

Describing further, in the embodiment shown by the curved line at the foot of FIG. 35B, from the time t1 to the time t2, for example, the already held workpiece 5 is processed with the already held tool 3. Successively, at the time t2, the errors in the contour of the already held tool 3 used in the processing are measured and, after replacing the already held tool 3, errors in the contour of the renewed held tool 3 are measured. The tool shape difference CA1 is thus determined.

At the time t2, to prevent formation of the steps on the surface of the already held workpiece 5, the position of the already held tool 3 is properly corrected in accordance with the errors in the contour of the already held tool 3 determined at the time t2, and then processing the already held workpiece 5 is started. Meanwhile, at the time t2, processing is started without immediately carrying out correction on the basis of the value CA1.

From the time t2 through the time t3, the correction value for the already held tool 3 is gradually changed as processing of the already held workpiece 5 progresses. Further, from the time t2 through the time t3, the depth of wear of the already held tool 3 at the time t3 may be (for example predicted) on the basis of the depth of wear from the time t1 to the time t2 and then the already held workpiece 5 may be processed with the already held tool 3 with properly correcting the position of the already held tool 3. At the time t3 as the time next to replacement or such of the already held tool 3, the shape of the already held workpiece 5 is identical to the target shape, or a plus shape that is slightly larger than the target shape, or a minus shape that is slightly larger than the target shape. The curved line at the foot of FIG. 35B is the minus shape.

Even at any time after the time t3, as with the cases of the times t1 through t3, the already held workpiece 5 is processed with the already held tool 3.

Next, descriptions will be given about a case where the already held tool 3 is subject to truing with reference to FIGS. 35A, 35B and 35C.

What is shown by the reference sign t1 in FIG. 35C is a shape of the already held tool (unused or renewed already held tool for example) 3 that has not been used for processing the already held workpiece 5. What is shown by the reference sign t2a in FIG. 35C is a shape of the already held tool 3 just prior to truing. What is shown by the reference sign t2*a* in FIG. 35C is a shape of the already held tool 3 just after truing.

Meanwhile, while also in the above description the time t2 (*t2a*, t2*b*) and the time t3 may be recognized as flash times, the time t2 and such substantially have some time widths.

The curved line at the head of FIG. 35B depicts the shape of the surface of the already held workpiece 5 when the already held workpiece 5 is processed with the already held tool 3 with correcting the position of the already held tool 3 (correction allowing steps) in accordance with the truing of the already held tool 3.

Meanwhile, for convenience of explanation, in the embodiment shown by the curved line at the head of FIG. 35B, it is supposed that the already held tool 3 is already subject to truing. In the embodiment shown by the curved line at the head of FIG. 35B, the steps 49 are formed at the times t2, t3 when the already held tool 3 is subject to truing.

In contrast, by properly correcting the position of the already held tool 3 in accordance with the difference of the shapes of the already held tools 3, the shape of the surface of the already held workpiece 5 (work shape) comes to be a shape as shown by the curved line at the foot of FIG. 35B without forming steps. Meanwhile, the error in the shape of the already held workpiece 5 after being processed shown by the curved line at the foot of FIG. 35B fall within a tolerance.

Describing further, in the embodiment shown by the curved line at the foot of FIG. 35B, from the time t1 to the time t2, for example, the already held workpiece 5 is processed with the already held tool 3. This processing causes wear with a value CA1 on the already held tool 3 (see FIG. 35C).

Successively, at the time t2 (*t2a*), the errors in the contour of the already held tool 3 used in the processing and before truing are measured. More specifically, the shape of the already held tool 3 shown by the reference sign t2*b* in FIG. 35C is measured.

Successively executed is truing the already held tool 3. This truing causes the already held tool 3 to have a shape difference with a value CA2 (see FIG. 35C).

Successively, at the time t2 (*t2b*), executed is measuring errors in the contour of the already held tool 3 treated with truing. More specifically, the shape of the already held tool 3 as shown by the reference sign t2*b* in FIG. 35C is measured.

And, at the time t2, to prevent formation of the steps on the surface of the already held workpiece 5, the position of the already held tool 3 subject to truing is properly corrected in accordance with a tool shape difference CA2 determined at the time t2, and then processing the already held workpiece 5 is started. Meanwhile, at the time t2, processing is started without immediately carrying out correction on the basis of the value CA2.

From the time t2 through the time t3, the correction value for the already held tool 3 is gradually changed as processing of the already held workpiece 5 progresses. Further, from the time t2 through the time t3, the depth of wear of the already held tool 3 at the time t3 may be (for example predicted) on the basis of the depth of wear from the time t1 to the time t2 and then the already held workpiece 5 may be processed with the already held tool 3 with properly correcting the position of the already held tool 3. At the time t3 as the time next to replacement or such of the already held tool 3, the shape of the already held workpiece 5 is identical to the target shape, or a plus shape that is slightly larger than the target shape, or a minus shape that is slightly larger than the target shape. The curved line at the foot of FIG. 35B is the minus shape.

Even at any time after the time t3, as with the cases of the times t1 through t3, the already held workpiece 5 is processed with the already held tool 3.

As the tool 3 before replacement is considerably worn, the workpiece 5 comes into a state where it is short of being cut. Thus creation of the steps may be suppressed by tracing back in a certain length the range where the tool 3 before replacement carries out processing (processing path), controlling cut-in by reducing the correction value (reducing the cut-in depth) in the beginning, and gradually transferring to a proper correction value.

More specifically, to prevent the already held workpiece 5 from being short of being cut (to reduce the shape difference of the already held workpiece 5 after being processed), the control section 13 may be so constituted as to correct the position of the already held tool by tracing back to the midway section of the processing path between two times when the errors in the contour of the already held tool 3 are measured.

Figure 36A:
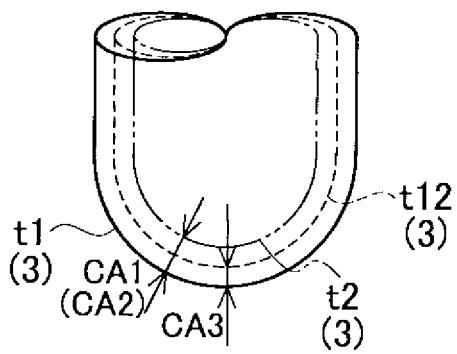
FIG. 36A is a schematic elevational view of a tool to describe a time-dependent change of its outline.

Further descriptions will be given with reference to FIGS. 36A and 36B. FIG. 36A is a schematic drawing showing outlines of the already held tool 3 at times t1, t12 and t2. The time t2 shown in FIG. 36 is later than the time t1 and the time t3 is later than the time t2. Further, the time t12 is a time existing in between the time t1 and the time t2. While the time t12 is a time of the midway section of the processing path, the time t12 and the time at the midway section of the processing path may be slightly different from each other.

Figure 36B:
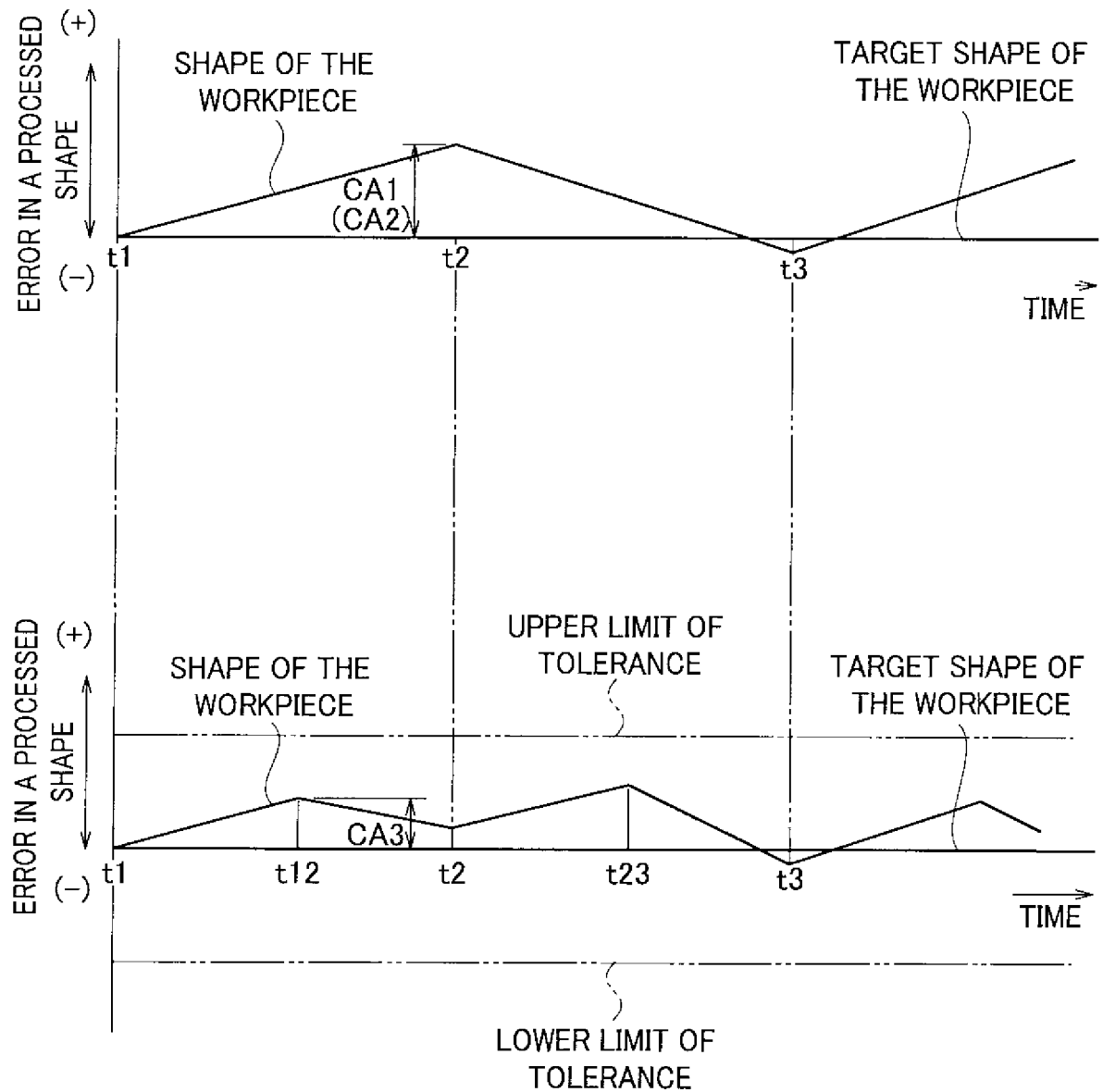
FIG. 36B is a graph of time-dependent changes in errors of processing shapes in order to compare those caused by method for correction.

The curved line at the head of FIG. 36B depicts the shape difference of the already held workpiece 5 when processing has been carried out as with the case shown by the curved line at the foot of FIG. 35B. A tool shape difference with a value CA1 (CA2) is created at the time t2 in the curved line at the head of FIG. 36B.

After carrying out processing as with the case shown at the foot of FIG. 35B, from the time t1 through the time t2, to prevent the already held workpiece 5 from being short of being cut, by tracing back to the midway section (the section shown by the time t12 for example) of the processing path between two times t1 and t2 when the errors in the contour of the already held tool 3 are measured, the position of the already held tool 3 is corrected and then processing is carried out. Thereby, as shown by the curved line at the foot of FIG. 35B, the processing precision of the already held workpiece 5 is improved. Thereby, a tool shape difference with a value CA3 (the value CA3<the value CA2) is created at the time T12.

Describing further, in the shape of the already held workpiece 5 shown by the curved line at the foot of FIG. 36B, any processing is not made relative to the curved line at the head of FIG. 36B on sections of the processing path corresponding to the times t1 through t12, but processing is carried out relative to the curved line at the head of FIG. 36B on sections of the processing path corresponding to the times t12 through t2.

After carrying out processing as with the case shown by the curved line at the foot of FIG. 35B, from the time t2 through the time t3, to prevent the already held workpiece 5 from being short of being cut, by tracing back to the midway section (the section shown by the time t23 for example) of the processing path between two times t2 and t3 when the errors in the contour of the already held tool 3 are measured, the position of the already held tool 3 is corrected and then processing is carried out. This processing is carried out on sections corresponding to the times t2 through t23 in a way as not to create steps at the time t2. Thereby, as shown by the curved line at the foot of FIG. 36B, the processing precision of the already held workpiece 5 is improved.

Even at any time after the time t3, as with the cases of the times t1 through t3, the already held workpiece 5 is processed with the already held tool 3.

Figure 23:
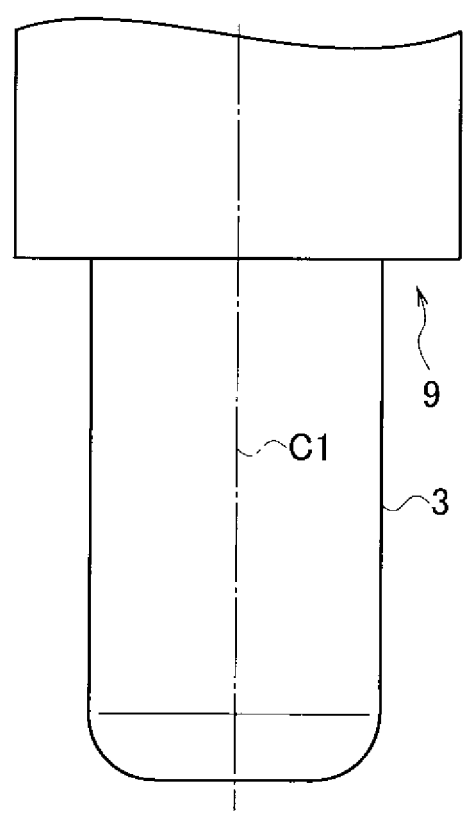
FIG. 23 is a schematic elevational view of a tool according to another example, which is a radius-end mill.

Further, as the tool 3, in place of the ball-end mill, the radius-end mill as shown in FIG. 23 may be used.

While the radius-end mill 3 is formed to be a columnar shape in general, at one end in an elongation direction about a central axis C1 of the column, a boundary between the side face of the column and the bottom face of the column (the bottom face of a circular shape) is rounded in an arc shape with a predetermined radius. The radius of the arc is made to be smaller than a radius of the aforementioned column. Meanwhile, if the radius of the arc at the boundary is equal to the radius of the aforementioned column, it becomes a shape of a ball-end mill.

The cutting-teeth of the radius-end mill 3 are formed on an outer periphery of one end section (a section on the side face of the column at the arc and around the arc and one end face). As with the ball-end mill 3, the radius-end mill 3 is to be held by the tool holding section as another end section of the proximal section engages with the tool holding section.

In the above description, by using the tool shape measuring device 31 to calculate the errors in the contour of the tool 3 (already held tool) and carrying out the initial configuration process, a process for correcting the NC program (processing path) at the time of processing is carried out so as to balance out the errors in the contour of the tool 3.

This could be modified in a way as described below. More specifically, in addition to the correction of the errors in the contour measured by the aforementioned tool shape measuring device 31, more accurate processing of the workpiece 5 could be embodied by measuring depths of wear of the tool 3 from staring processing the workpiece 5 by the tool 3 through the end thereof and considering the shape of the tool 3 occurring changes originated from these depths of wear to correct the NC program.

Figure 33A:
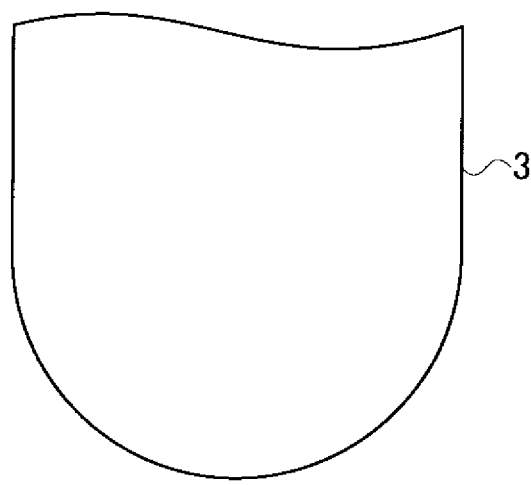
FIG. 33A is a schematic elevational view of a tool at a time of starting processing.
Figure 33B:
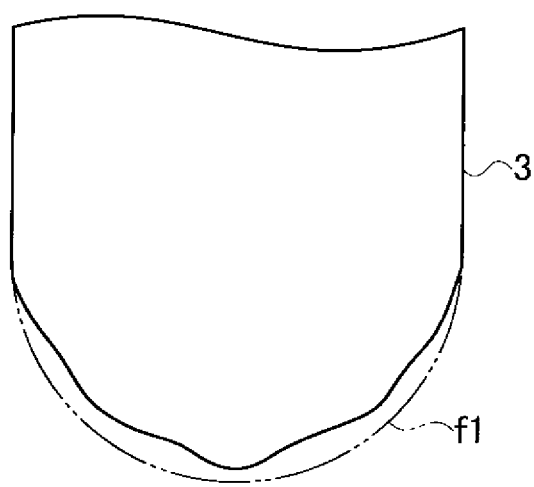
FIG. 33B is a schematic elevational view of a tool at a time of finishing processing.

FIG. 33 are explanatory drawings showing shapes of a tip section of the tool 3, FIG. 33A shows a shape of the tool 3 before processing and FIG. 33B shows a shape of the tool 3 after finishing processing and a depth of wear f1. As being understood from FIG. 33, the tool 3 wears and changes in shape as continuing processing. In the present embodiment, the NC program is corrected with considering the shape change by wearing.

As a process for collecting data of depths of wear, executed is using the tool 3 to actually process the workpiece 5 and storing the depths of wear at this processing time in a memory or such.

In this process, a processing path in any arbitrary processing from starting processing the workpiece 5 with the tool 3 through finishing the processing is taken. And, in the processing path, a location where the tool 3 is in contact with the workpiece 5 and a location where they are not in contact are calculated and a travel distance at the location where the tool 3 is in contact with the workpiece 5 is defined as a "cutting travel distance".

Figure 24:
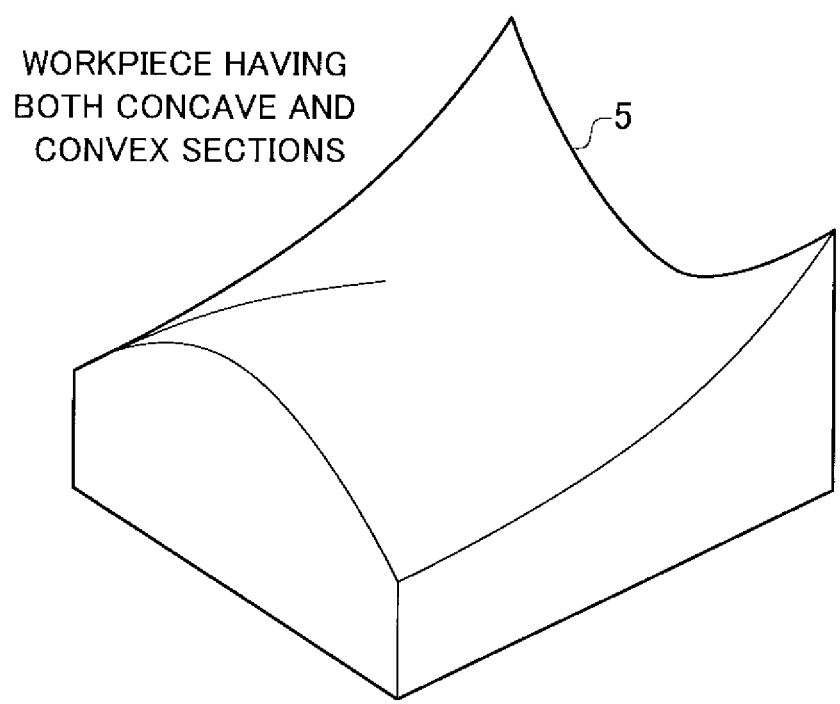
FIG. 24 is a schematic perspective view of a surface shape of a workpiece according to an example.
Figure 25A:
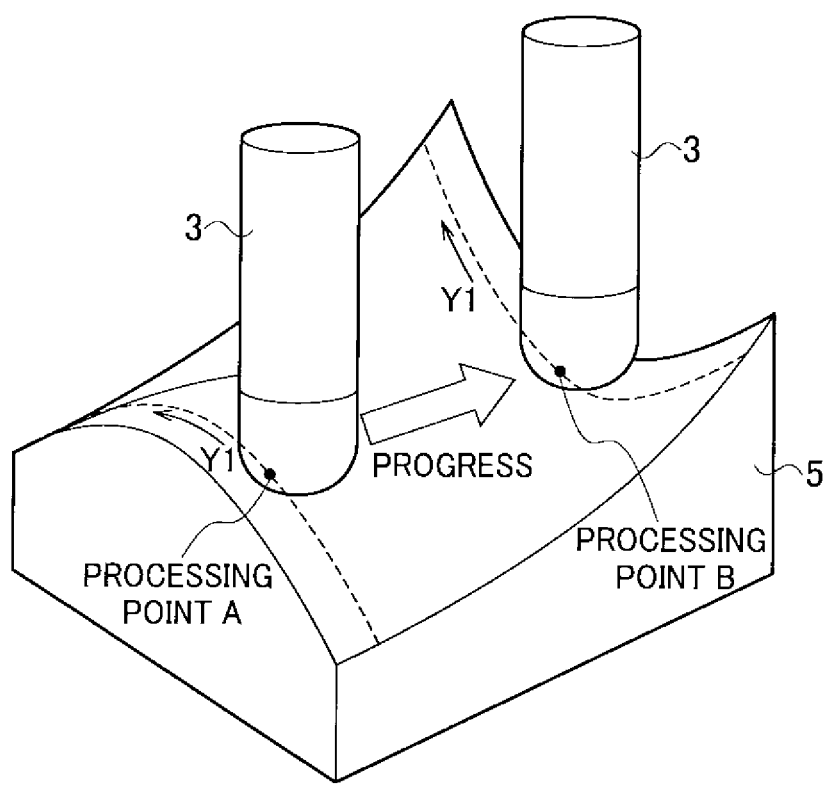
FIG. 25A is a schematic perspective view of a tool and a workpiece to describe a process in which the tool is in motion with keeping in contact with the workpiece.
Figure 25B:
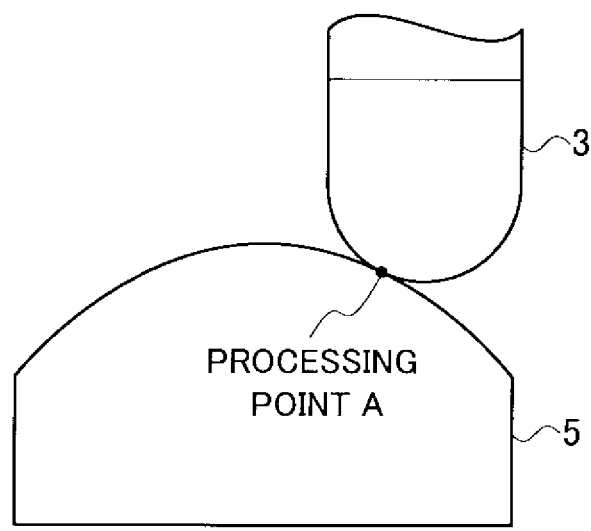
FIG. 25B is a schematic elevational view of a tool and a workpiece, which shows an aspect where a convex surface is to be processed.
Figure 25C:
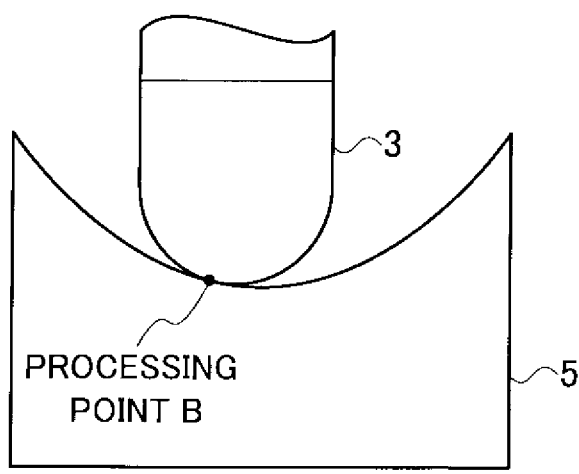
FIG. 25C is a schematic elevational view of a tool and a workpiece, which shows an aspect where a concave surface is to be processed.

A method for calculating the "cutting travel distance" will be hereafter described with reference to FIGS. 24, 25A, 25B and 25C. In a case where a workpiece 5 in which its surface has a curved shape, as shown in FIG. 24, is to be cut for example, as shown in FIG. 25A, by carrying out processes in series, in which the tool 3 is moved toward a first direction (a direction shown by an arrow Y1 here) and further slide-moved in a direction perpendicular to the first direction, and it is again moved in the direction of the arrow Y1 to carry out cutting. In this occasion, in accordance with the processing shape, as the processing point A shown in FIG. 25B and the processing point B shown in FIG. 25C for example, a section where the tip section of the tool 3 is in contact with the workpiece 5 can be acknowledged in accordance with the processing point.

More specifically, from starting processing with the tool 3 to finishing it, during movement of the tool 3, a distance where the tip of the tool 3 is in contact with the workpiece 5 and then travels, namely the cutting travel distance, can be calculated. Meanwhile, in regard to determination whether contact or non-contact, a case where a depth of processing by the tool 3 from the surface of the workpiece 5 is 0.5 μm or more is determined to be a state in that the tool 3 is in contact with the workpiece 5. Alternatively, as another determination criterion, a case where a distance between the tool 3 and the surface of the workpiece 5 in a finished shape is a considerable value or less is determined to be a state in that the tool 3 is in contact with the workpiece 5. These criterion are, however, not limiting.

And, executed are calculating relations between the cutting travel distances and the depths of wear of the tool 3 and storing the relations as a correspondence table in a memory or such. And, at a time of real processing, executed are estimating an amount of shape change of the tool 3 by wearing and correcting the NC program. Details thereof will be described below.

FIG. 26 are explanatory drawings showing steps for processing the workpiece 5 with the tool 3 and the cutting travel distance of the tool 3. FIG. 26A shows a shape of the workpiece 5, which has a planar section and a curved surface section on its surface. FIG. 26B is an explanatory drawing showing a processing route at a time of processing the workpiece 5 with the tool 3. As shown in FIG. 26B, the tool 3 is made to move in a first direction (traverse direction) and then process the workpiece 5, further slide in a second direction (pick feed direction), and further repeat moving in the first direction and then processing the workpiece 5.

Figure 26A:
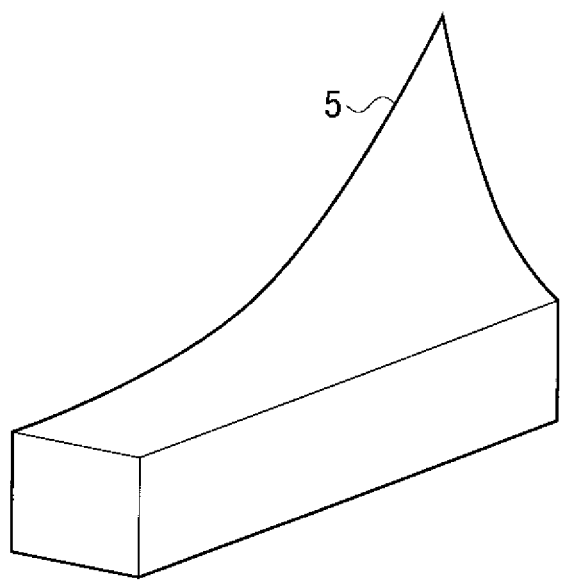
FIG. 26A is a schematic perspective view of a surface shape of a workpiece according to an example.
Figure 26B:
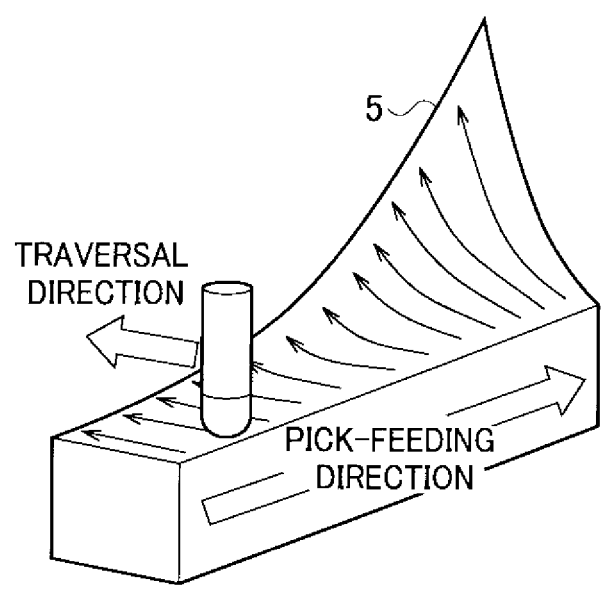
FIG. 26B is a schematic perspective view of a tool, which shows a tool being in motion over the workpiece shown in FIG. 26A.
Figure 26C:
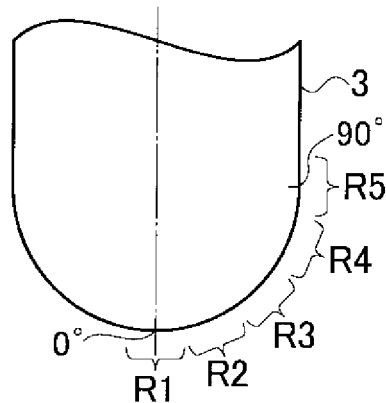
FIG. 26C is a schematic elevational view of the tool to describe an example where a tip of the tool shown in FIG. 26B is divided into several regions.
Figure 26D:
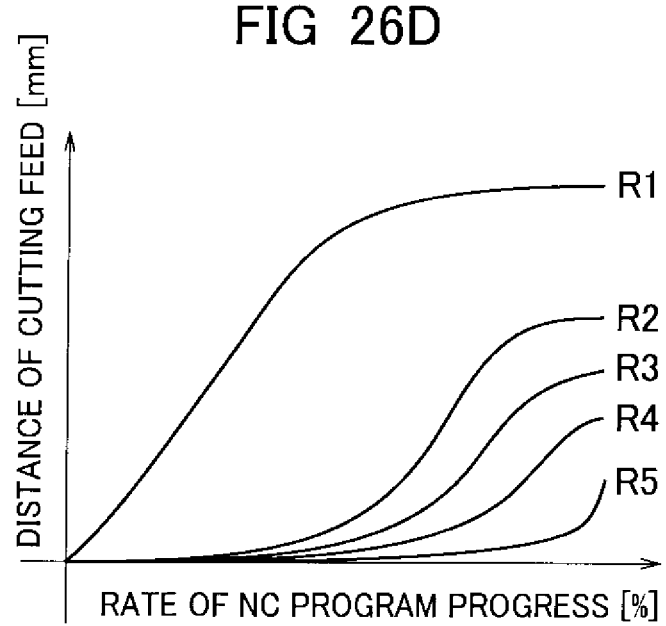
FIG. 26D is a graph showing a distance of cutting feed to a rate of NC program progress according to each region.

FIG. 26C is a drawing showing a region of the tip section of the tool 3, and FIG. 26D is a graph showing relations between a rate of progress of the NC program (%) and cutting travel distances of respective spots of the tip section of the tool 3.

As shown in FIG. 26C, where the axial direction of the tool 3 is defined as "0 degree", a direction perpendicular to the axis of the tool 3 is defined as "90 degrees", a region around 0 degree is defined as a region R1, and a region around 90 degrees is defined as a region R5, the tip section of the tool 3 is divided into five regions R1, R2, R3, R4 and R5. Distances of cutting the workpiece 5 by the respective regions R1-R5 can be thus calculated from the date in the NC program and can be drawn as the graph shown in FIG. 26D. Meanwhile, in the present embodiment, an example in which it is divided into the five regions R1-R5 will be explained but the present invention is not limited thereto.

Therefore, the data of the cutting travel distances by the respective regions R1-R5 relative to the progress of the NC program at a time of executing processing the workpiece 5 are obtained. More specifically, in the present embodiment, the cutting travel distances at a time when the tool 3 is in contact with the workpiece 5 in the processing path of the tool 3 at a time of practically processing the workpiece 5 are calculated. Then, referring CAD data, executed are specifying a region where the tool 3 is in contact with the workpiece 5 from the regions R1-R5, and further determining the cutting travel distances of the respective regions R1-R5.

Figure 27:
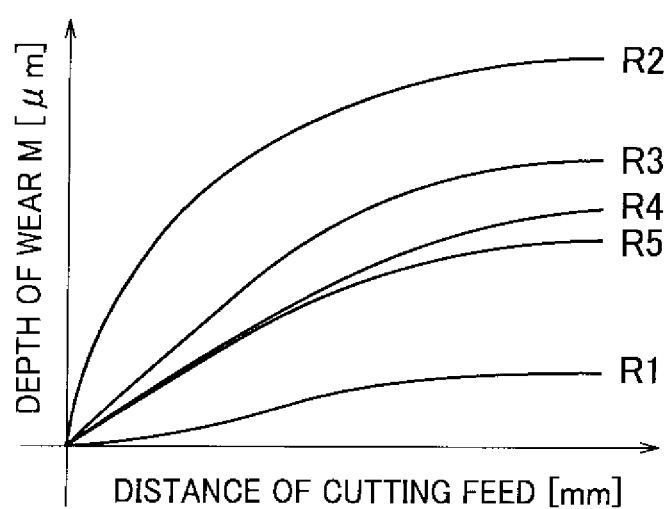
FIG. 27 is a graph showing a depth of wear to a distance of cutting feed according to each region.

FIG. 27 is a graph showing relations between the cutting travel distances and the depths of wear of the respective regions R1-R5 when the tool 3 is acted in accordance with the NC program and used to process the workpiece 5. As being understood from the graph of FIG. 27, it is understood that, in a condition where the cutting travel distances are constant, the depth of wear in the region R1 around 0 degree of the tip of the tool 3 becomes relatively small, the depth of wear in the region R2 is larger, and the depth of wear becomes smaller again toward the region R5. More specifically, in general, the depths of wear establish a relation R2>R3>R4>R5>R1.

And, the control section 13 can estimate the depths of wear at the respective regions R1-R5 relative to the progress of the NC program on the basis of the graph shown in FIG. 26D and the graph shown in FIG. 27. For example, a graph shown in FIG. 28 can be obtained.

Figure 28:
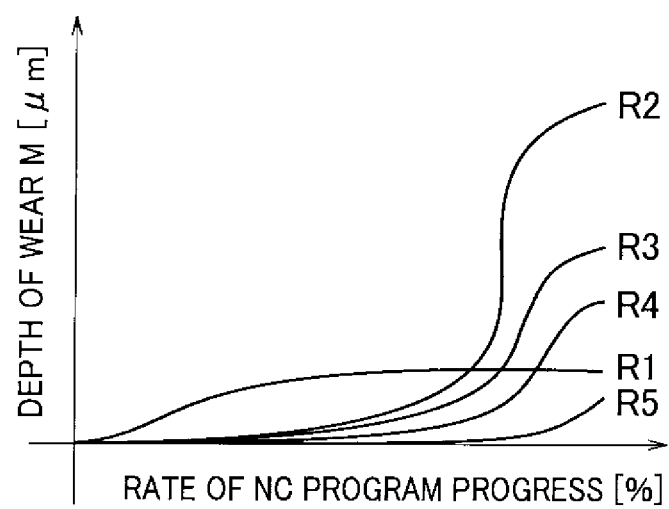
FIG. 28 is a graph showing relations between rates of NC program progress and depths of wear of the respective regions.

And, by referring the graph shown in FIG. 28, the depths of wear M of the respective regions R1-R5 relative to the progress of the NC program can be estimated. By using this result of estimation, the shape of the tool 3 is corrected and then processing with high precision is carried out. A detailed method of correction may be by correcting the NC program by calculating the errors in the contour shown in the first embodiment as described above and further considering the aforementioned depths of wear M.

Concretely, the depths of wear M are respectively calculated with respect to 91 angles from 0 degree to 90 degrees at the tip of the tool 3 and the errors in the contour based on the shape of the tool 3 when the progress of the NC program is 100% (more specifically, the shape of the tool 3 with considering the depths of wear M) are, as reference signs #600-690, stored in the memory of the control section 13. More specifically, "#500-#590" are reference signs by the errors in the contour without considering the depths of wear M and "#600-#690" are reference signs by the errors in the contour with considering the depths of wear M.

Figure 32:
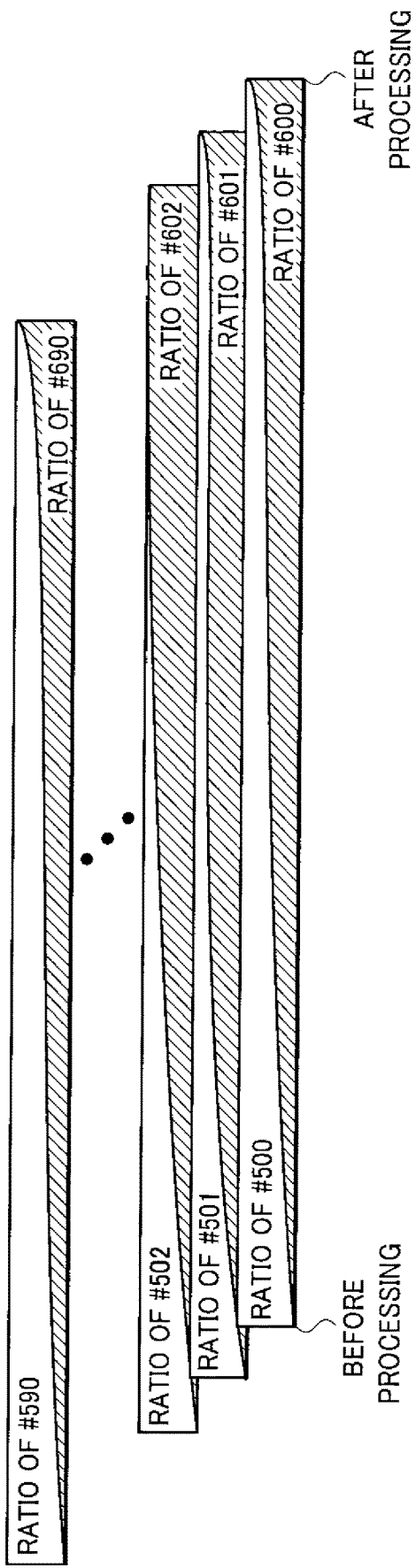
FIG. 32 is a drawing describing an example for calculating correction values in light of changes in depths of wear.

And, in accordance with the progress of processing, the NC program is corrected by apportioning the reference signs #500-#590 and the reference signs #600-#690 to calculate the correction value. FIG. 32 is an explanatory drawing showing apportioning rates of the reference sign #500 and the reference sign #600 at each degree from 0 to 90 degrees. The apportioning rates are set from starting processing by the tool 3 to finishing it. As being understood from FIG. 32, before starting processing, the reference signs #500-#590 by the errors in the contour without considering the depths of wear M are set to be 100% and the reference signs #600-#690 with considering the depth of wear M are set to be 0%. Thereafter, as the progress of processing gets higher, the ratios of the reference signs #600-#690 are increased and the ratios of the reference signs #500-#590 are decreased. At the time of finishing processing, the reference signs #500-#590 by the errors in the contour without considering the depths of wear M are set to be 0% and the reference signs #600-#690 with considering the depth of wear M are set to be 100%.

Where [−1.68077+[−0.90974*[#565*0.227+#566*0.773]]], as the X component as recited in (f85) in FIG. 8 as described above, is exemplified, the reference sign [#565] is set to be a value in which [#565] and [#665] are apportioned in a predetermined ratio. Similarly, the reference sign [#566] is set to be a value in which [#566] and [#666] are apportioned in a predetermined ratio.

Concretely, "#565*0.227" shown in (f8) in FIG. 8 is set to be "(0.667)*(#565)+(0.333)*(#665)". In this case, the ratio of the reference sign #565 by the errors in the contour without considering the depths of wear M is "0.667" and the reference sign #665 by the errors in the contour with considering the depths of wear M is "0.333".

Figure 30:
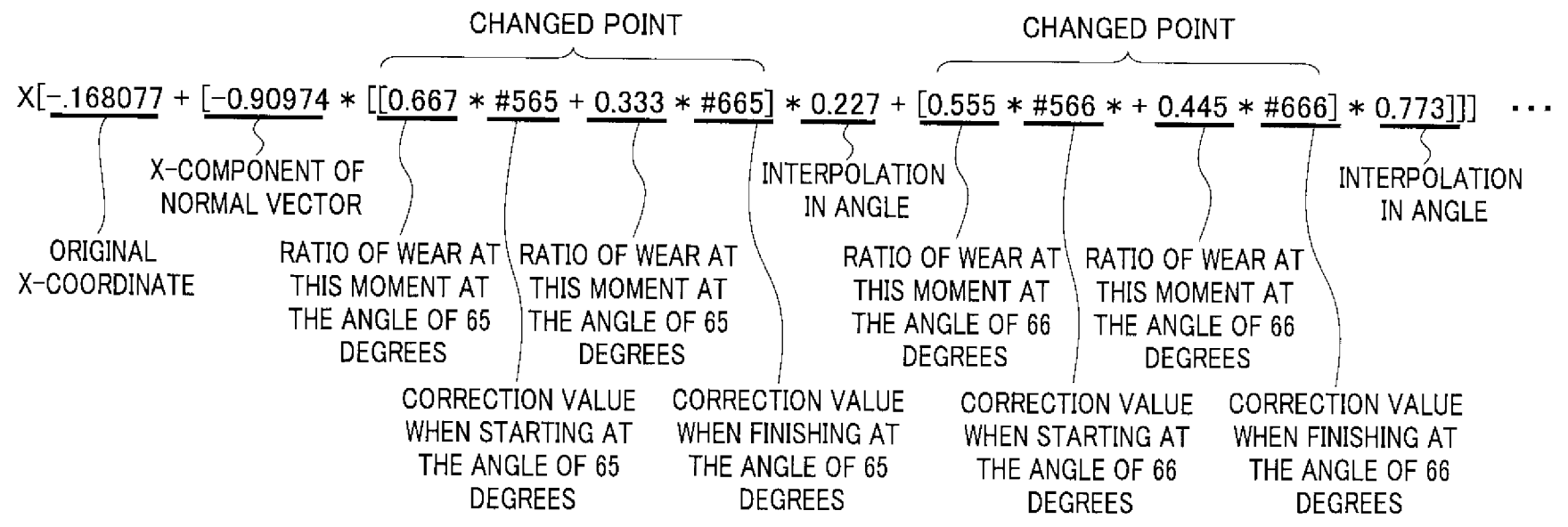

More specifically, in the case of the angle 65 degrees, as shown by the expression in FIG. 30, the X coordinate is calculated. Meanwhile, whereas the Y coordinate and the Z coordinate are omitted, they are expressed by similar expressions for the X coordinate.

A shape of the real tool after changed by wear cannot be known until measurement is carried out after processing. Depths of wear can be, however, estimated by referring the graph shown in FIG. 28 as described above.

Figure 31:
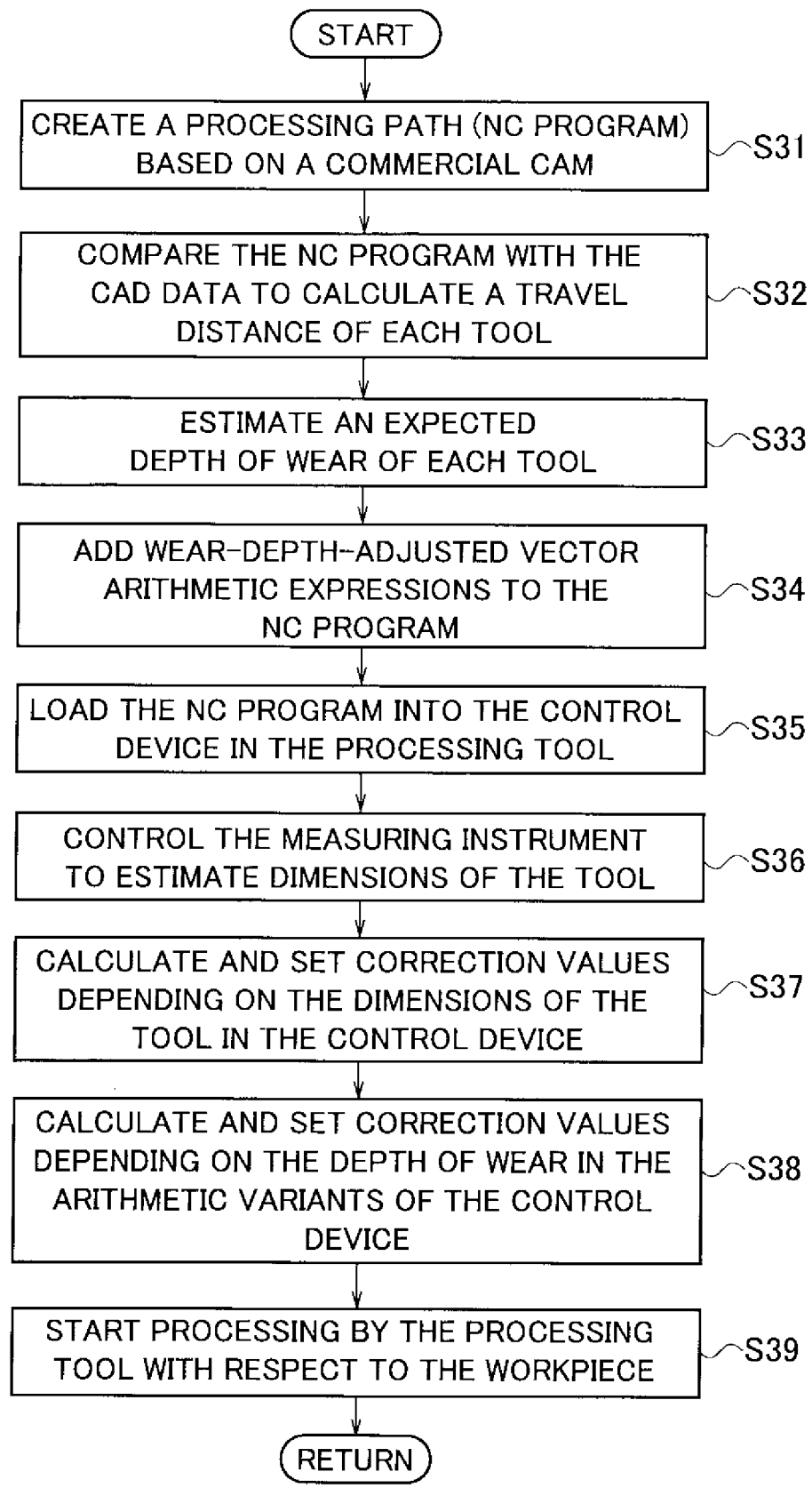
FIG. 31 is a flowchart showing steps of a process by a processing machine according to another embodiment.

Next, with reference to a flowchart shown in FIG. 31, steps of a process by the processing machine for the workpiece.

First, at a step S31 in FIG. 31, executed is creating the NC program at a time of processing the workpiece 5, namely three-dimensional coordinates of the processing path by the tool 3, on the basis of a commercially available CAM.

At a step S32 executed is comparing the NC program with the CAD data for the processing machine to calculate the cutting travel distances of the respective regions R1-R5 of the tool 3 by using the aforementioned method.

At a step S33 executed is estimating the depths of wearing of the respective regions R1-R5 for each cutting travel distance. In concrete terms, executed is preparing the graph shown in FIG. 28 and estimating the depths of wear M of the respective regions R1-R5 in accordance with the rate of progress.

At a step S34 executed is adding a vector expression to which estimation of wear is added to the NC program and further storing total depths of wear of the tool 3 for each angle (0 degree to 90 degrees) in a dedicated file or such.

At a step S35 executed is loading the NC program to the control section 13 of the processing machine 1.

At a step S36 executed is measuring the shape of the tool 3 for processing the workpiece 5 by the tool shape measuring device 31 using laser or such to collect the tool shape.

At a step S37 executed is calculating the correction values for the NC program on the basis of the tool shape collected in the process of the step S14 and setting the reference signs (#500-#590) in the memory or such of the control section 13.

At a step S38 executed is calculating the correction values for the NC program on the basis of the data of the depths of wear of the tool 3 and setting the reference signs (#600-#690) in the memory or such of the control section 13. Thereafter, at the step S39, executed is starting processing by the tool 3. The tool 3 could be thereby operated with correcting the NC program on the basis of the errors in the contour of the tool 3 with considering the depths of wear of the tool 3, thereby processing the workpiece 5.

In the processing machine for the workpiece in accordance with the present embodiment, thereby the depths of wear of the tool 3, which would change as processing progresses, are measured in advance and the depths of wear in accordance with the cutting travel distance are estimated. And, as the processing progresses from starting processing the workpiece 5 with the tool 3, the ratios of the reference signs "#500-#590" without considering the depths of wear M and the reference signs "#600-#690" with considering the depths of wear M are changed and then the NC program is corrected. Therefore proper correction of the NC program in accordance with the errors in the contour of the tool 3 and the depths of wear of the tool 3 is enabled and processing with high precision on the workpiece 5 is enabled.

Meanwhile, although one example of the ratios between the reference signs #500-#590 and the reference signs #600-#690 shown in FIG. 32 is referred to describe the invention, the present invention is not limited thereto and any proper modification is possible in accordance with the shapes of the workpiece 5 and the tool 3 or any other statuses.

Next, a modified example of the present embodiment will be described. In the description above, as shown in FIG. 32, the apportionment of the reference signs #500-#590 showing the correction values by the errors in the contour without considering the depths of wear and the reference signs #600-#690 showing the correction values by the errors in the contour with considering the depths of wear is changed in accordance with the progress of the NC program during the time of starting processing by the tool 3 and the time of finishing processing.

In the modified example, one or more intermediate points from starting processing to finishing and setting are set, the reference signs "#500-#590" showing correction values by the errors in the contour without considering the depths of wear and the reference signs "#600-#690" showing the correction values by the errors in the contour with considering the depths of wear are set, and then apportionment thereof is changed.

Figure 34:
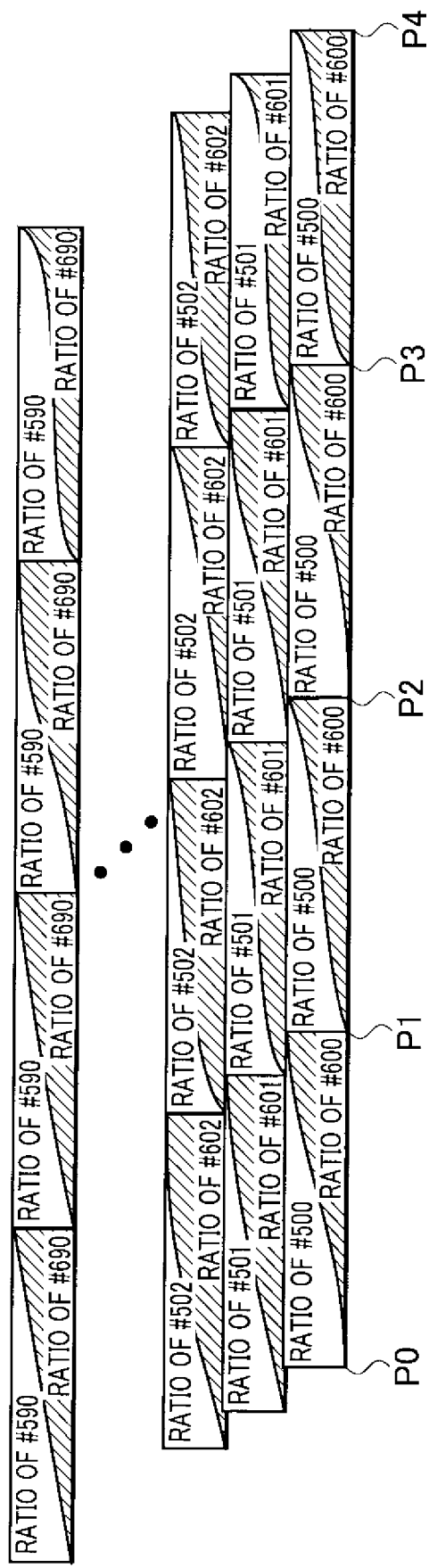
FIG. 34 is a drawing describing an example where correction values are calculated according to estimation of depths of wear at certain times from the start through the finish of processing.

For example, as shown in FIG. 34, three intermediate points P1, P2 and P3 are set between a process start point P0 and a process finish point P4. And, at the respective intermediate points P1-P3, data of depths of wear estimated in advance are taken and stored in a memory. And, at respective sections of from the process start point P0 to the intermediate point P1, from the intermediate point P1 to P2, from the intermediate point P2 to P3, and from the intermediate point P3 to the process finish point P4, ratios of the reference signs #500-#590 and the reference signs #600-#690 are set. The method for calculating processing positions in the X-axis, the Y-axis and the X-axis is similar to that already explained.

When processing the section of P0-P1, correction values by the errors in the contour without considering the depths of wear at the intermediate point P1 are set to be the reference signs #500-#590 in the section of P0-P1. Further, correction values by the errors in the contour with considering the depths of wear estimated at the intermediate point P1 are set to be the reference signs #600-#690 in the section of P0-P1.

When the tool 3 reaches the intermediate point P1, the tool 3 is halted at the intermediate point P1 and the tool shape of the tool 3 is measured. And, correction values are calculated on the basis of the calculated errors in the contour (real values of the tool shape at the intermediate point P1) and the estimated depths of wear at the intermediate point P2 and are then to be the reference signs #600-#690 in the section of P1-P2.

Further, the reference signs #600-#690 at the section of P0-P1 are substituted in the reference signs #500-#590 at the section of P1-P2.

And, when the tool 3 reaches the intermediate point P2, the tool 3 is halted at the intermediate point P2 and the tool shape of the tool 3 is measured, and correction values are calculated on the basis of the calculated errors in the contour (real values of the tool shape at the intermediate point P2) and the estimated depths of wear at the intermediate point P3 and are then to be the reference signs #600-#690 in the section of P2-P3.

Similarly, the reference signs #600-#690 at the section of P1-P2 are substituted in the reference signs #500-#590 at the section of P2-P3.

And, when the tool 3 reaches the intermediate point P3, the tool 3 is halted at the intermediate point P3 and the tool shape of the tool 3 is measured, and correction values are calculated on the basis of the calculated errors in the contour (real values of the tool shape at the intermediate point P3) and the estimated depths of wear at the intermediate point P4 and are then to be the reference signs #600-#690 in the section of P3-P4.

Further, the reference signs #600-#690 at the section of P2-P3 are substituted in the reference signs #500-#590 at the section of P3-P4.

Thus at each case when reaching the intermediate points P1-P3, as the tool shape of the tool 3 is measured and the reference signs #600-#690 showing the correction values by the errors in the contour with considering the estimated depths of wear are set, it is enabled to improve precision in processing further.

More specifically, while, in the example described already, the depths of wear at the time of finishing processing alone are considered to set the reference signs #600-690 showing the correction values by the errors in the contour with considering the depths of wear, the processing path from the start of processing to the end of processing is divided into four sections, and, as the reference signs #500-590 showing the correction values by the errors in the contour without considering the depths of wear at each section and the reference signs #600-#690 showing the correction values by the errors in the contour with considering the depths of wear are set, precision of processing can be further improved.

Further, at the respective intermediate points P1, P2 and P3, as the value of "the ratio of #600 is 100%" at the time of finishing the section and the value of "the ratio of #500 is 100%" at the time of starting the next section meet with each other, rapid fluctuation of the tool 3 can be avoided. Moreover, at the time of starting again processing after halting the tool 3, formation of steps can be avoided.

In the present modified example, as the processing path by the tool 3 is thereby divided into plural (four, for example) sections and reference signs by wear are set, the processing position of the tool 3 can be set more precisely.

By the way, the content described above may be grasped as a method for processing the workpiece.

More specifically, it may be grasped as a method for processing the workpiece, which is provided with a workpiece holding step for holding the workpiece, a tool holding step for holding a tool for processing the already held workpiece held in the workpiece holding step, a moving step for moving the already held tool relative to the already held workpiece in order to process the already held workpiece with the already held tool held in the tool holding step, where the moving step is a step for moving the already held tool relative to the already held workpiece on the basis of an NC program and an expression for calculating a position of the already held tool is incorporated in the NC program.

In the method for processing the workpiece as described above, the NC program may use the expression to correct the position of the already held tool in order to suppress creation of processing errors of the already held workpiece by errors in a contour of the already held tool.

Further, in the method for processing the workpiece as described above, correction of the position of the already held tool on the basis of the errors in the contour of the already held tool may be carried out in regard to one processing point or a plurality of processing points on the already held tool at a time of processing the already held workpiece.

Further, in the method for processing the workpiece as described above, in a case where spots of the already held tool where the errors in the contour are determined are selected discretely (discontinuously) and the processing points exist on spots of the already held tool where the errors in the contour do not exist, two spots adjacent to each other with having the processing point interposed therebetween may be used to calculate the errors in the contour of the processing point and then the calculated errors in the contour may be used to correct the position of the already held tool.

Further, in the method for processing the workpiece as described above, a curve showing the errors in the contour of the already held tool may be filtered by changing cutoff frequencies (cutoff values) for the errors in the contour of the already held tool depending on radii of the surface to be processed of the already held workpiece relative to radii of an arc portion of the already held tool, and on the basis of the filtered errors in the contour the position of the already held tool may be corrected.

Further, in the method for processing the workpiece as described above, according to a radius of a surface to be processed of the already held workpiece relative to a radius of the arc section of the already held tool, by changing ranges for averaging at a time of averaging the errors in the contour of the already held tool, the curve showing the errors in the contour of the already held tool may be averaged and then, with using the averaged errors in the contour, the position of the already held tool may be corrected.

Further, in the method for processing the workpiece as described above, correction of the position of the already held tool may be carried out by using the errors in the contour of the already held tool at the processing point or around the processing point in accordance with a shape tolerance of the already held workpiece at the processing point.

Further, in the method for processing the workpiece as described above, a contour error measurement step for carrying out measurement of the errors in the contour of the already held tool at each predetermined time, and, to prevent formation of steps on a surface of the already held workpiece before and after correction of the position of the already held tool in accordance with the measurement results at the contour error measurement step, the position of the already held tool may be corrected as processing of the already held workpiece by the already held tool progresses.

Further, in the method for processing the workpiece as described above, a tool shape difference measurement step for carrying out measurement of the errors in the contour of the already held tool may be carried out just before and just after replacement of the already held tool to determine a shape difference of the already held tools or measurement of the errors in the contour of the already held tool may be carried out just before truing the already held tool and just after truing the already held tool to determine a tool shape difference of the already held tools, and, to prevent formation of steps on a surface of the already held workpiece before and after replacement of the already held tool or truing the already held tool, the position of the already held tool may be corrected in accordance with the tool shape difference determined at the tool shape difference measurement step.

Further, in the method for processing the workpiece as described above, to prevent the already held workpiece from being short of being cut, the position of the already held tool may be corrected by tracing back to the midway section of the processing path between two times when the errors in the contour of the already held tool are measured.

Further, in the method for processing the workpiece as described above, a processing path as a path through which the already held tool moves from starting processing the workpiece until finishing the processing may be calculated and cutting travel distances as distance by which respective spots of the already held tool cut the workpiece may be calculated on the basis of the NC program and as well a relation between the cutting travel distance for each spot and a depth of wear may be obtained in accordance with the depths of wear by the respective spots after finishing processing by the already held tool and the NC program may be corrected on the basis of the relation between the cutting travel distance and the depth of wear as well as the errors in the contour of the already held tool.

Further, in the method for processing the workpiece as described above, a ratio of correction values by errors in the contour without considering the depths of wear to correction values by errors in the contour with considering the depths of wear may be set and the ratio of the correction values by the errors in the contour without considering the depths of wear may be decreased as the processing path goes from start of the processing to end of the processing and as well the ratio of the correction values by the errors in the contour with considering the depths of wear may be increased.

Further, in the method for processing the workpiece as described above, the processing path may be divided into plural paths, depths of wear of the already held tool may be obtained for each path, and correction values by errors in the contour without considering the depths of wear to correction values by errors in the contour with considering the depths of wear may be set.

Further, the contents as described above may be grasped as a program (NC program; processing program for the workpiece).

More specifically, it may be grasped as a program for causing a processing machine for a workpiece to carry out a moving step for moving an already held tool relative to an already held workpiece in order to process the already held workpiece held by a workpiece holding section with the already held tool held by a tool holding section, where an expression for calculating a position of the already held tool is incorporated in the program.

In the program as described above, the expression may be used to correct the position of the already held tool in order to suppress creation of processing errors of the already held workpiece caused by the errors in the contour of the already held tool.

Further, in the program as described above, correction of the position of the already held tool on the basis of the errors in the contour of the already held tool may be carried out in regard to one processing point or a plurality of processing points on the already held tool at a time of processing the already held workpiece.

Further, in the program as described above, in a case where spots of the already held tool where the errors in the contour are determined are selected discretely (discontinuously) and the processing points exist on spots of the already held tool where the errors in the contour do not exist, two spots adjacent to each other with having the processing point interposed therebetween may be used to calculate the errors in the contour of the processing point and then the calculated errors in the contour may be used to correct the position of the already held tool.

Further, in the program as described above, a curve showing the errors in the contour of the already held tool may be filtered by changing cutoff frequencies (cutoff values) for the errors in the contour of the already held tool depending on radii of the surface to be processed of the already held workpiece relative to radii of an arc portion of the already held tool, and on the basis of the filtered errors in the contour the position of the already held tool may be corrected.

Further, in the program as described above, according to a radius of a surface to be processed of the already held workpiece relative to a radius of the arc section of the already held tool, by changing ranges for averaging at a time of averaging the errors in the contour of the already held tool, the curve showing the errors in the contour of the already held tool may be averaged and then, with using the averaged errors in the contour, the position of the already held tool may be corrected.

Further, in the program as described above, correction of the position of the already held tool may be carried out by using the errors in the contour of the already held tool at the processing point or around the processing point in accordance with a shape tolerance of the already held workpiece at the processing point.

Further, in the program as described above, a contour error measurement step for carrying out measurement of the errors in the contour of the already held tool at each predetermined time, and, to prevent formation of steps on a surface of the already held workpiece before and after correction of the position of the already held tool in accordance with the measurement results at the contour error measurement step, the position of the already held tool may be corrected as processing of the already held workpiece by the already held tool progresses.

Further, in the program as described above, a tool shape difference measurement step for carrying out measurement of the errors in the contour of the already held tool may be carried out just before and just after replacement of the already held tool to determine a shape difference of the already held tools or measurement of the errors in the contour of the already held tool may be carried out just before truing the already held tool and just after truing the already held tool to determine a tool shape difference of the already held tools, and, to prevent formation of steps on a surface of the already held workpiece before and after replacement of the already held tool or truing the already held tool, the position of the already held tool may be corrected in accordance with the tool shape difference determined at the tool shape difference measurement step.

Further, in the program as described above, to prevent the already held workpiece from being short of being cut, the position of the already held tool may be corrected by tracing back to the midway section of the processing path between two times when the errors in the contour of the already held tool are measured.

Further, in the program as described above, a processing path as a path through which the already held tool moves from starting processing the workpiece until finishing the processing may be calculated and cutting travel distances as distance by which respective spots of the already held tool cut the workpiece may be calculated on the basis of the NC program and as well a relation between the cutting travel distance for each spot and a depth of wear may be obtained in accordance with the depths of wear by the respective spots after finishing processing by the already held tool and the NC program may be corrected on the basis of the relation between the cutting travel distance and the depth of wear as well as the errors in the contour of the already held tool.

Further, in the program as described above, a ratio of correction values by errors in the contour without considering the depths of wear to correction values by errors in the contour with considering the depths of wear may be set and the ratio of the correction values by the errors in the contour without considering the depths of wear may be decreased as the processing path goes from start of the processing to end of the processing and as well the ratio of the correction values by the errors in the contour with considering the depths of wear may be increased.

Further, in the program as described above, the processing path may be divided into plural paths, depths of wear of the already held tool may be obtained for each path, and correction values by errors in the contour without considering the depths of wear to correction values by errors in the contour with considering the depths of wear may be set.

Although certain exemplary embodiments are described above, modifications and variations of the embodiments will occur to those skilled in the art, in light of the above teachings.

The invention claimed is:

1. A method for processing a workpiece with a tool, comprising:
   holding the workpiece;
   holding the tool;
   with an NC program including an arithmetic expression configured to calculate a position of the held tool, wherein the arithmetic expression includes values for correcting errors in a contour of the held tool, wherein the values for correcting the errors in the arithmetic expression are calculated as to one or more processing points of the held tool:
      determining a cut-off frequency from a numerical difference between a radius of a surface to be processed on the held workpiece and a radius of an arc portion of the held tool,
      filtering a curve depicting the errors in the contour of the held tool to remove frequency components from the curve that are higher than the cut-off frequency, and
      reflecting the filtered curve in the arithmetic expression; and
   moving the held tool relative to the held workpiece in accordance with the NC program including the arithmetic expression configured to calculate the position of the held tool.

2. The method of claim 1, further comprising:
   selecting discretely a plurality of spots where the errors in the contour are to be measured; and
   in a case where one of the processing points is distinct from the discretely selected spots, using errors in the contour measured at two spots adjacent to each other [with] and having the processing point at issue interposed therebetween to calculate an error at the processing point at issue and then using the calculated error to correct the position of the held tool.

3. The method of claim 2, wherein the held tool is a ball-end mill or a radius-end mill, the method further comprising:
   using either the errors in the contour of the held tool at the processing points or the errors in the contour of the held tool around the processing points in accordance with a shape tolerance of the held workpiece at the processing points to correct the position of the held tool.

4. The method of claim 1, wherein the held tool is a ball-end mill or a radius-end mill, the method further comprising:
  changing a range for averaging at a time of averaging a curve depicting the errors in the contour of the held tool in accordance with a radius of a surface to be processed of the held workpiece relative to a radius of an arc portion of the held tool; and
  correcting the position of the held tool on the basis of the averaged errors in the contour.

5. The method of claim 1, wherein the held tool is a ball-end mill or a radius-end mill, the method further comprising:
  using either the errors in the contour of the held tool at the processing points or the errors in the contour of the held tool around the processing points in accordance with a shape tolerance of the held workpiece at the processing points to correct the position of the held tool.

6. A machine for processing a workpiece with a tool, comprising:
  a holding section configured to hold the workpiece;
  a tool holding section configured to hold the tool;
  a control section including an NC program including an arithmetic expression configured to calculate a position of the held tool, the control section being configured to:
    determine a cut-off frequency from a numerical difference between a radius of a surface to be processed on the held workpiece and a radius of an arc portion of the held tool,
    filter a curve depicting errors in the contour of the held tool to remove frequency components from the curve that are higher than the cut-off frequency, and
    reflect the filtered curve in the arithmetic expression; and
  a moving section configured to move the held tool relative to the held workpiece, the moving section being controlled by the control section.

* * * * *